United States Patent
Fujishiro et al.

(10) Patent No.: US 10,972,877 B2
(45) Date of Patent: Apr. 6, 2021

(54) RADIO TERMINAL AND BASE STATION

(71) Applicant: KYOCERA Corporation, Kyoto (JP)

(72) Inventors: Masato Fujishiro, Yokohama (JP);
Hiroyuki Adachi, Kawasaki (JP);
Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/399,382

(22) Filed: Apr. 30, 2019

(65) Prior Publication Data

US 2019/0261140 A1 Aug. 22, 2019

Related U.S. Application Data

(63) Continuation of application No. PCT/JP2017/039609, filed on Nov. 1, 2017.
(Continued)

(51) Int. Cl.
*H04W 4/06* (2009.01)
*H04W 4/80* (2018.01)
(Continued)

(52) U.S. Cl.
CPC .............. *H04W 4/06* (2013.01); *H04W 4/80* (2018.02); *H04W 24/08* (2013.01);
(Continued)

(58) Field of Classification Search
CPC ......... H04W 4/06; H04W 4/80; H04W 24/08; H04W 72/005; H04W 74/0833; H04W 76/27; H04W 80/02
See application file for complete search history.

(56) References Cited

U.S. PATENT DOCUMENTS 7,197,323 B2 * 3/2007 Terry .................. H04W 72/04
455/458
8,300,566 B2 * 10/2012 Kuo ..................... H04W 48/12
370/312
(Continued)

FOREIGN PATENT DOCUMENTS

CN 108430113 A * 8/2018
EP 3499924 A1 * 6/2019 ............ H04W 48/10
EP 3522576 A4 * 9/2019 ............ H04W 76/27

OTHER PUBLICATIONS

Tsoukaneri et al., Group Communications in Narrowband-IoT: Architecture, Procedures, and Evaluation, Jun. 2018, IEEE Internet of Things Journal, vol. 5, No. 3, doi: 10.1109/JIOT.2018.2807619 (Year: 2018).*

(Continued)

*Primary Examiner* — Eric Nowlin
(74) *Attorney, Agent, or Firm* — Studebaker & Brackett PC

(57) ABSTRACT

A user equipment supports MBMS (Multimedia Broadcast Multicast Service) transmission using SC-PTM (Single Cell Point-To-Multipoint). The user equipment receives an MBMS service from a base station via SC-MTCH (Single Cell Multicast Traffic Channel). The user equipment receives, from the base station, MAC (Medium Access Control) CE (Control Element) indicating a suspension of transmission of the MBMS service via the SC-MTCH. The user equipment determines that the transmission of the MBMS service via the SC-MTCH is suspended in response to the reception of the MAC CE.

7 Claims, 29 Drawing Sheets

Related U.S. Application Data

(60) Provisional application No. 62/417,519, filed on Nov. 4, 2016.

(51) Int. Cl.
| | |
|---|---|
| *H04W 76/27* | (2018.01) |
| *H04W 24/08* | (2009.01) |
| *H04W 72/00* | (2009.01) |
| *H04W 74/08* | (2009.01) |
| *H04W 80/02* | (2009.01) |

(52) U.S. Cl.
CPC ..... *H04W 72/005* (2013.01); *H04W 74/0833* (2013.01); *H04W 76/27* (2018.02); *H04W 80/02* (2013.01)

(56) References Cited

U.S. PATENT DOCUMENTS

| | | | | |
|---|---|---|---|---|
| 8,811,252 | B2* | 8/2014 | Maeda | H04L 5/0007 370/312 |
| 8,913,538 | B2* | 12/2014 | Lee | H04W 28/06 370/312 |
| 9,137,779 | B2* | 9/2015 | Wang | H04W 40/00 |
| 9,185,634 | B2* | 11/2015 | Kuo | H04W 48/12 |
| 9,265,030 | B2* | 2/2016 | Wang | H04L 12/1845 |
| 9,306,993 | B2* | 4/2016 | Maeda | H04W 72/0466 |
| 10,375,532 | B2* | 8/2019 | Fujishiro | H04W 76/28 |
| 10,728,710 | B2* | 7/2020 | Siddiqui | H04W 4/06 |
| 10,798,532 | B2* | 10/2020 | Fujishiro | H04W 76/28 |
| 2008/0081598 | A1* | 4/2008 | Chandra | H04W 24/10 455/414.1 |
| 2008/0261573 | A1* | 10/2008 | Kuo | H04W 48/12 455/414.2 |
| 2009/0149164 | A1* | 6/2009 | Cai | H04W 72/005 455/414.2 |
| 2010/0272004 | A1* | 10/2010 | Maeda | H04W 72/0466 370/312 |
| 2010/0284319 | A1* | 11/2010 | Wang | H04W 40/00 370/312 |
| 2010/0329170 | A1* | 12/2010 | Wu | H04W 72/005 370/312 |
| 2011/0222457 | A1* | 9/2011 | Lee | H04W 28/06 370/312 |
| 2012/0106430 | A1* | 5/2012 | Kuo | H04W 48/12 370/312 |
| 2013/0051305 | A1* | 2/2013 | Kuo | H04W 48/12 370/312 |
| 2014/0362756 | A1* | 12/2014 | Maeda | H04L 65/4076 370/312 |
| 2016/0192327 | A1* | 6/2016 | Yi | H04W 72/005 370/312 |
| 2018/0027578 | A1* | 1/2018 | Xu | H04L 5/0082 370/336 |
| 2018/0097541 | A1* | 4/2018 | Bhattad | H04B 1/713 |
| 2018/0352389 | A1* | 12/2018 | Fujishiro | H04W 76/28 |
| 2019/0174460 | A1* | 6/2019 | Zhang | H04L 5/001 |
| 2019/0222967 | A1* | 7/2019 | Ratilainen | H04L 1/0011 |
| 2019/0261140 | A1* | 8/2019 | Fujishiro | H04W 4/06 |
| 2019/0320295 | A1* | 10/2019 | Fujishiro | H04W 4/06 |
| 2020/0068359 | A1* | 2/2020 | Shan | H04W 4/06 |
| 2020/0137528 | A1* | 4/2020 | Al | H04W 72/005 |

OTHER PUBLICATIONS

Huawei et al., Correction on the Definition of SC-MCCH-Duration, May 23, 2016, 3GPP, 3GPP TSG-RAN WG2 Meeting #94, Tdoc: R2-163922 (Year: 2016).*

Huawei et al., Correction on the Definition of SC-MCCH-Duration, May 23, 2016, 3GPP, 3GPP TSG-RAN WG2 Meeting #94, Tdoc: R2-164532 (Year: 2016).*

Samsung, MCCH and MCCH Change Duration, Aug. 22, 2016, 3GPP, 3GPP TSG RAN WG2 Meeting #95, Tdoc: R2-165088 (Year: 2016).*

ZTE, SC-MCCH Scheduling and Change Notification, Oct. 10, 2016, 3GPP, 3GPP TSG-RAN WG2 Meeting#95bis, Tdoc: R2-166127 (Year: 2016).*

Huawei et al., SC-MCCH Scheduling and Update Notification in NB-IoT, Oct. 10, 2016, 3GPP, 3GPP TSG-RAN WG2 Meeting #95bis, Tdoc: R2-166317 (Year: 2016).*

Huawei et al., SC-MCCH scheduling and design for FeMTC, Oct. 10, 2016, 3GPP, 3GPP TSG-RAN WG2 Meeting #95bis, Tdoc : R2-166410 (Year: 2016).*

Samsung, SI and MCCH Change Notification Reception, Oct. 10, 2016, 3GPP, 3GPP TSG-RAN WG2 Meeting #95bis, Tdoc: R2-166472 (Year: 2016).*

Nokia et al., SC-PTM for FeMTC and eNB-IoT, Oct. 10, 2016, 3GPP, 3GPP TSG-RAN WG2 Meeting #95bis, Tdoc: R2-166535 (Year: 2016).*

Ericsson; "Details of SC-PTM support for NB-IoT UEs"; 3GPP TSG-RAN WG2 #95; Tdoc R2-165621; Aug. 22-26, 2016; total 6 pages; Gothenburg, Sweden.

ZTE Corporation; "Introduction of SC-PTM in MAC"; 3GPP TSG-RAN WG2 #92; R2-157180; Nov. 16-20, 2015; total 65 pages; Anaheim, US.

Ericsson, Nokia, ASB . . . , "WF on FeMTC SC-MTCH transmission", 3GPP TSG RAN WG1 Meeting #86bis, R1-1610666, Oct. 10-14, 2016, 5 pages, Lisbon, Portugal.

CATT, SC-MCCH Transmission and SC-MCCH Change Notification Mechanism for NB-IoT and eMTC, 3GPP TSG RAN WG2 Meeting #95bis, Oct. 10-14, 2016, 4 pages, R2-166214, Kaohsiung.

Huawei et al.; "Discussion on SC-PTM Configuration in FeMTC"; 3GPP TSG-RAN WG2 #95bis; R2-166415; Oct. 10-14, 2016; pp. 1-4; Kaohsiung, Taiwan.

Huawei; "36.331 Running CR to Capture Agreements on NB-IoT"; 3GPP TSG-RAN WG2 #93 Meeting; R2-162070; Feb. 15-20, 2016; pp. 1-5; San Julian's, Malta.

Kyocera; "Details of Multicast Configuration for FeMTC and eNB-IoT"; 3GPP TSG-RAN WG2 #96; R2-168029; Nov. 14-18, 2016; pp. 1-8; Reno, NV, USA.

Kyocera; RRC configuration of multicast enhancements for FeMTC and eNB-IoT; 3GPP TSG-RAN WG2 #95bis; R2-166851; Oct. 10-14, 2016; total 10 pages; Kaohsiung, Taiwan.

* cited by examiner

FIG. 9

SystemInformationBlockType20 information element

```
-- ASN1START

SystemInformationBlockType20-r13 ::=    SEQUENCE {
    sc-mcch-RepetionPeriod-r13          ENUMERATED {rf2, rf4, rf8, rf16, rf32, rf64, rf128, rf256},
    sc-mcch-Offset-r13                  INTEGER (0..10),
    sc-mcch-FirstSubframe-r13           INTEGER (0..9),
    sc-mcch-duration-r13                INTEGER (2..9)  OPTIONAL,
    sc-mcch-ModificationPeriod-r13      ENUMERATED {rf2, rf4, rf8, rf16, rf32, rf64, rf128, rf256,
                                            rf512, rf1024, rf2048, rf4096, rf8192, rf16384, rf32768,
                                            rf65536},
    lateNonCriticalExtension            OCTET STRING            OPTIONAL,
    ...
}

-- ASN1STOP
```

FIG. 10

SCPTMConfiguration message

```
-- ASN1START

SCPTMConfiguration-r13 ::=      SEQUENCE {
    sc-mtch-InfoList-r13         SC-MTCH-InfoList-r13,
    scptm-NeighbourCellList-r13  SCPTM-NeighbourCellList-r13    OPTIONAL,   -- Need OP
    lateNonCriticalExtension     OCTET STRING                   OPTIONAL,
    nonCriticalExtension         SEQUENCE {}                    OPTIONAL
}

-- ASN1STOP
```

SC-MTCH-InfoList information element

```
-- ASN1START

SC-MTCH-InfoList-r13 ::=         SEQUENCE (SIZE (0..maxSC-MTCH-r13)) OF SC-MTCH-Info-r13

SC-MTCH-Info-r13 ::=             SEQUENCE   {
    mbmsSessionInfo-r13              MBMSSessionInfo-r13,
    g-RNTI-r13                       BIT STRING(SIZE(16)),
    sc-mtch-schedulingInfo-r13       SC-MTCH-SchedulingInfo-r13         OPTIONAL,   --
Need OP
    sc-mtch-neighbourCell-r13        BIT STRING (SIZE(maxNeighCell-SCPTM-r13))
OPTIONAL,   -- Need OP
    ...
}

MBMSSessionInfo-r13 ::=          SEQUENCE   {
    tmgi-r13                         TMGI-r9,
    sessionId-r13                    OCTET STRING (SIZE (1))      OPTIONAL   -- Need OR
}

SC-MTCH-SchedulingInfo-r13::=    SEQUENCE   {
    onDurationTimerSCPTM-r13         ENUMERATED {
                                         psf1, psf2, psf3, psf4, psf5, psf6,
                                         psf8, psf10, psf20, psf30, psf40,
                                         psf50, psf60, psf80, psf100,
                                         psf200},
    drx-InactivityTimerSCPTM-r13     ENUMERATED {
                                         psf0, psf1, psf2, psf4, psf8,
                                         psf10, psf20, psf40,
                                         psf80, psf160, ps320,
                                         psf640, psf960,
                                         psf1280, psf1920, psf2560},
    schedulingPeriodStartOffsetSCPTM-r13  CHOICE {
        sf10                             INTEGER(0..9),
        sf20                             INTEGER(0..19),
        sf32                             INTEGER(0..31),
        sf40                             INTEGER(0..39),
        sf64                             INTEGER(0..63),
        sf80                             INTEGER(0..79),
        sf128                            INTEGER(0..127),
        sf160                            INTEGER(0..159),
        sf256                            INTEGER(0..255),
        sf320                            INTEGER(0..319),
        sf512                            INTEGER(0..511),
        sf640                            INTEGER(0..639),
        sf1024                           INTEGER(0..1023),
        sf2048                           INTEGER(0..2048),
        sf4096                           INTEGER(0..4096),
        sf8192                           INTEGER(0..8192)
    },
    ...
}

-- ASN1STOP
```

```
-- ASN1START

SCPTM-NeighbourCellList-r13 ::=  SEQUENCE (SIZE (1..maxNeighCell-SCPTM-r13)) OF PCI-ARFCN-r13

PCI-ARFCN-r13 ::=                SEQUENCE {
    physCellId-r13                   PhysCellId,
    carrierFreq-r13                  ARFCN-ValueEUTRA-r9     OPTIONAL
}

-- ASN1STOP
```

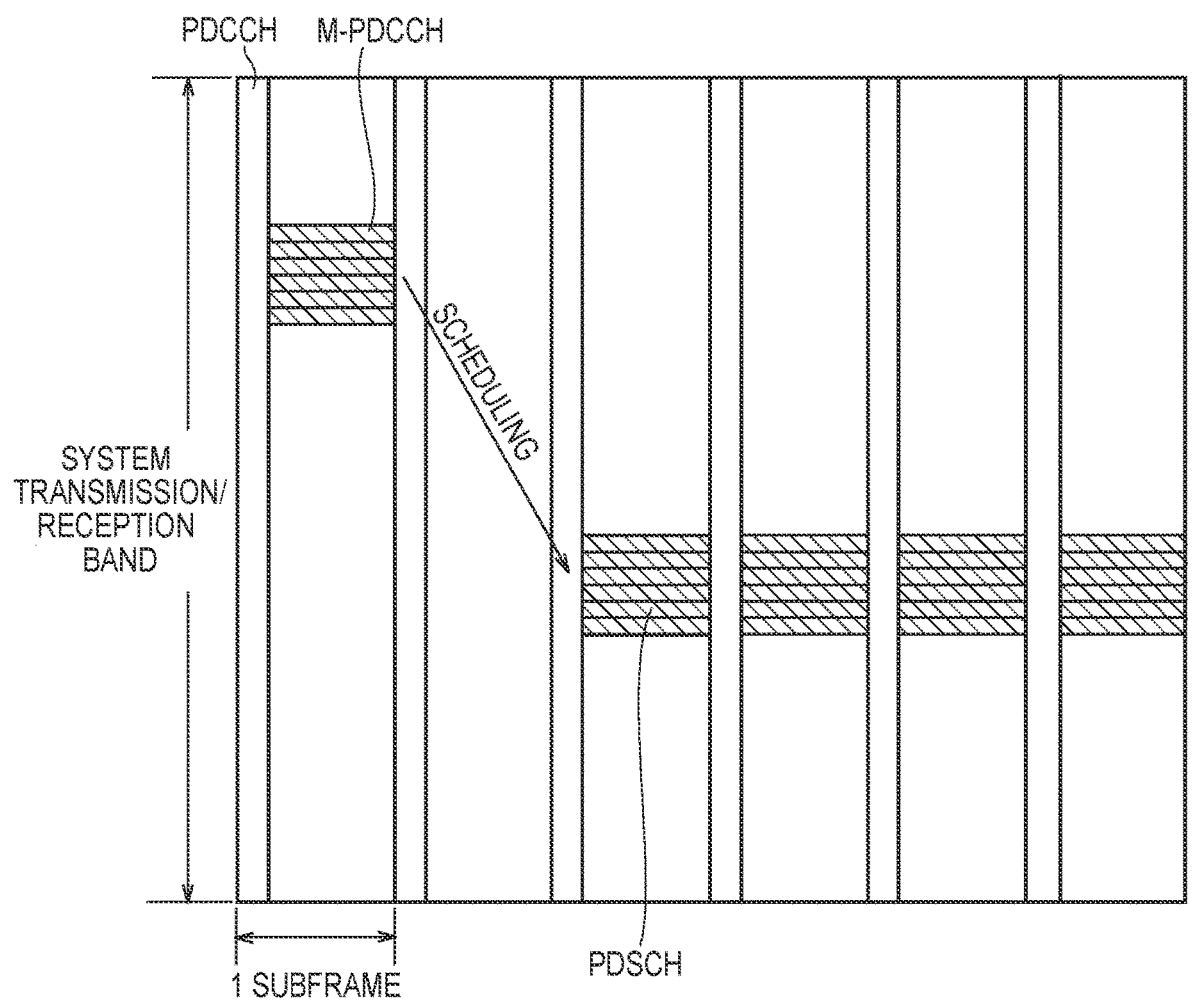

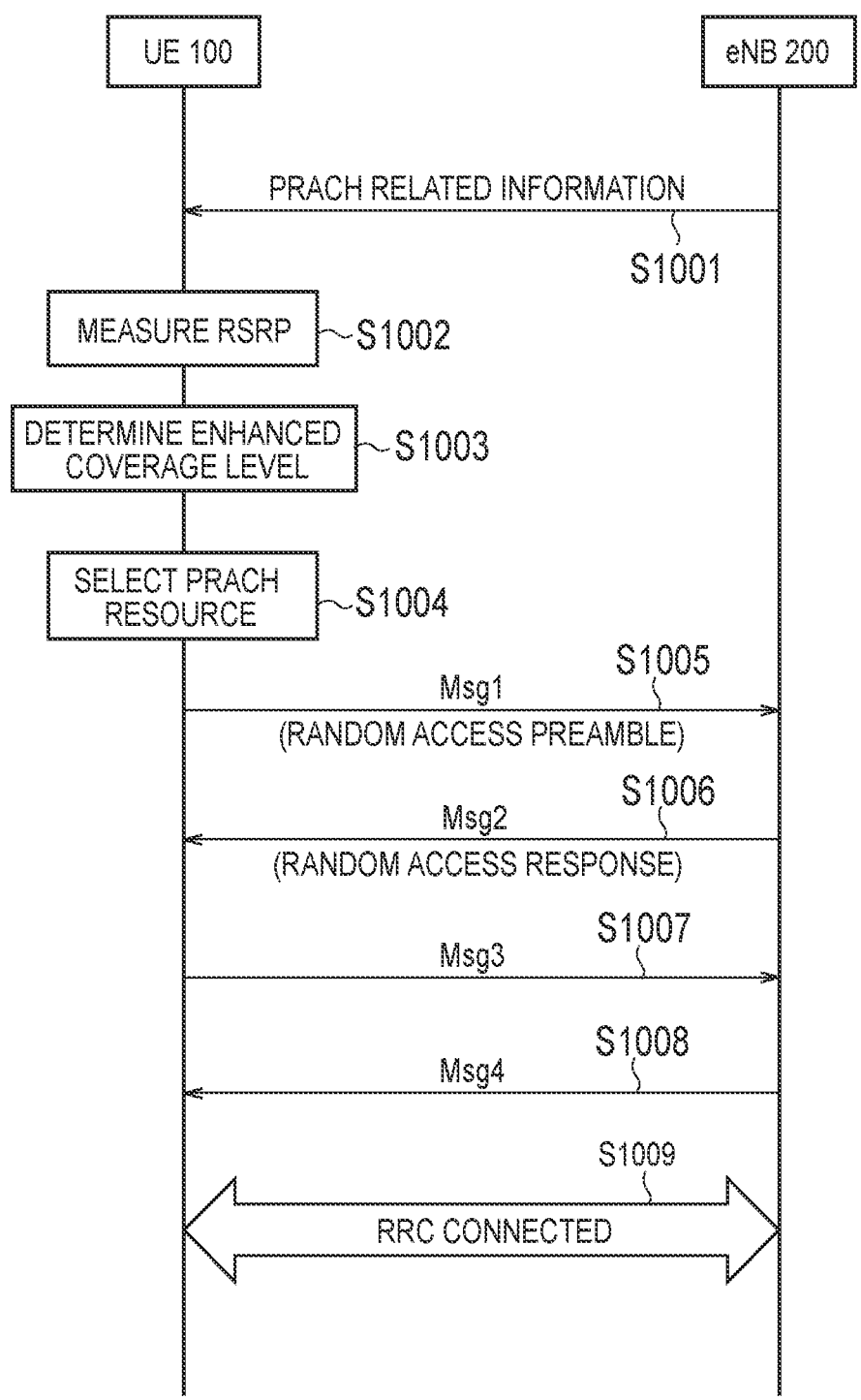

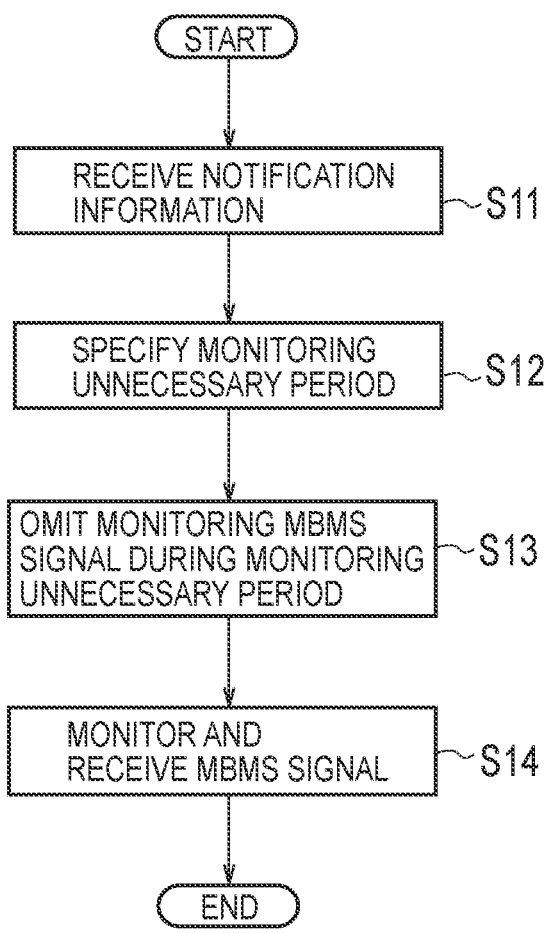

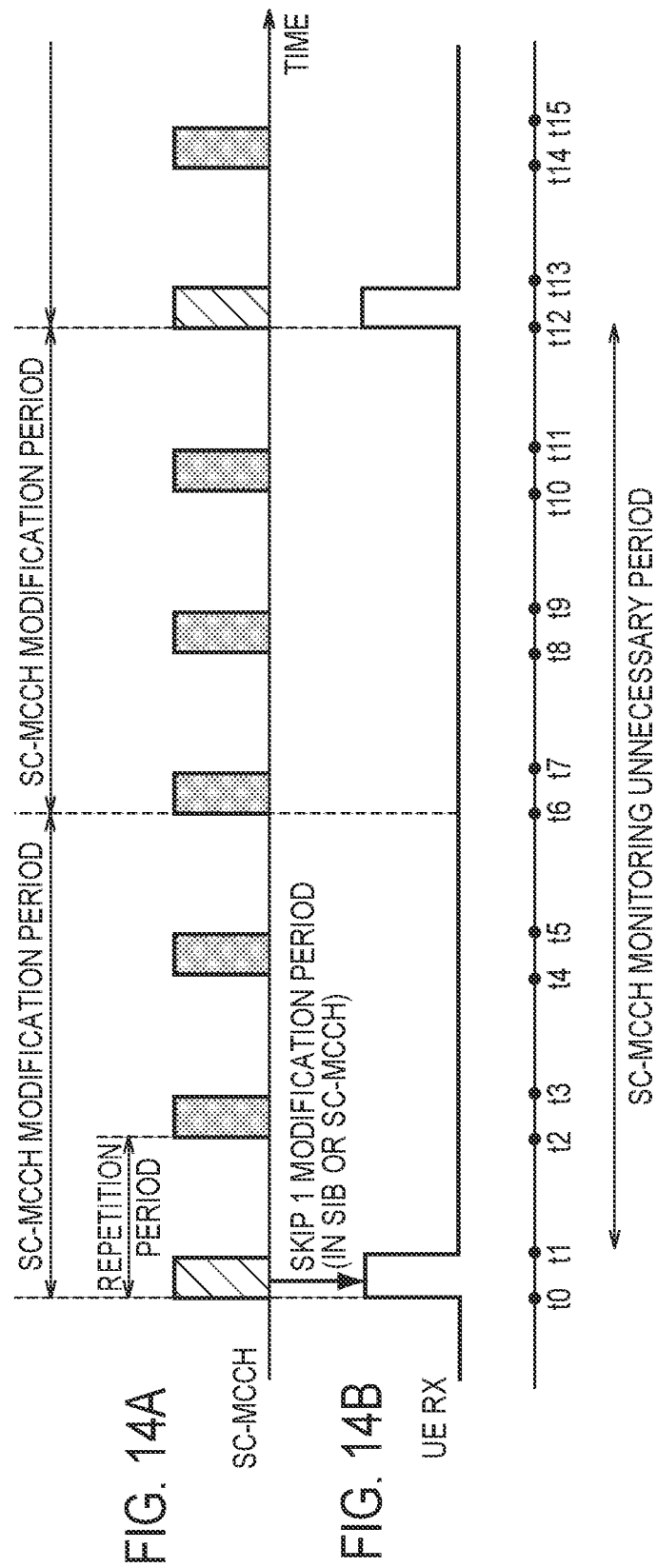

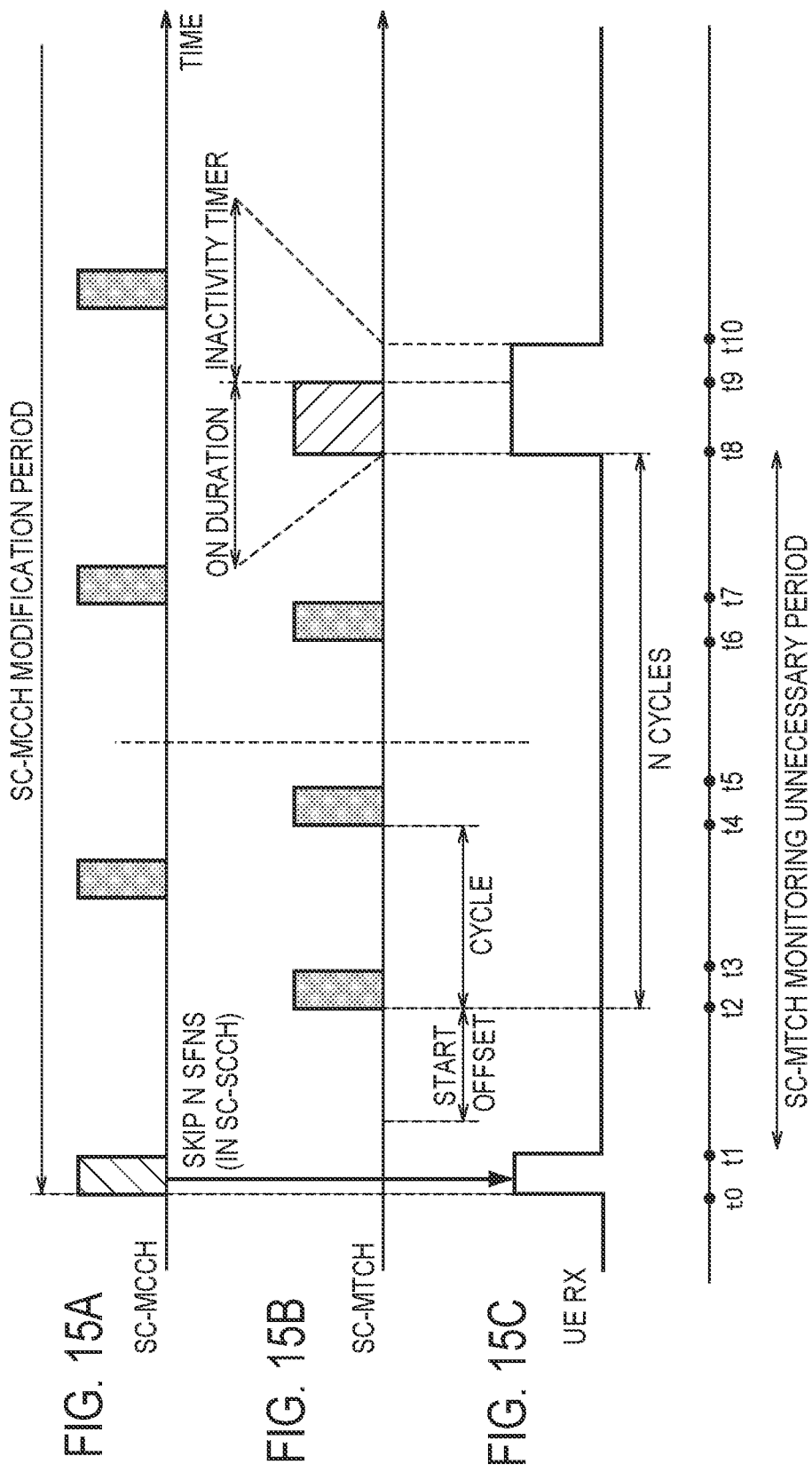

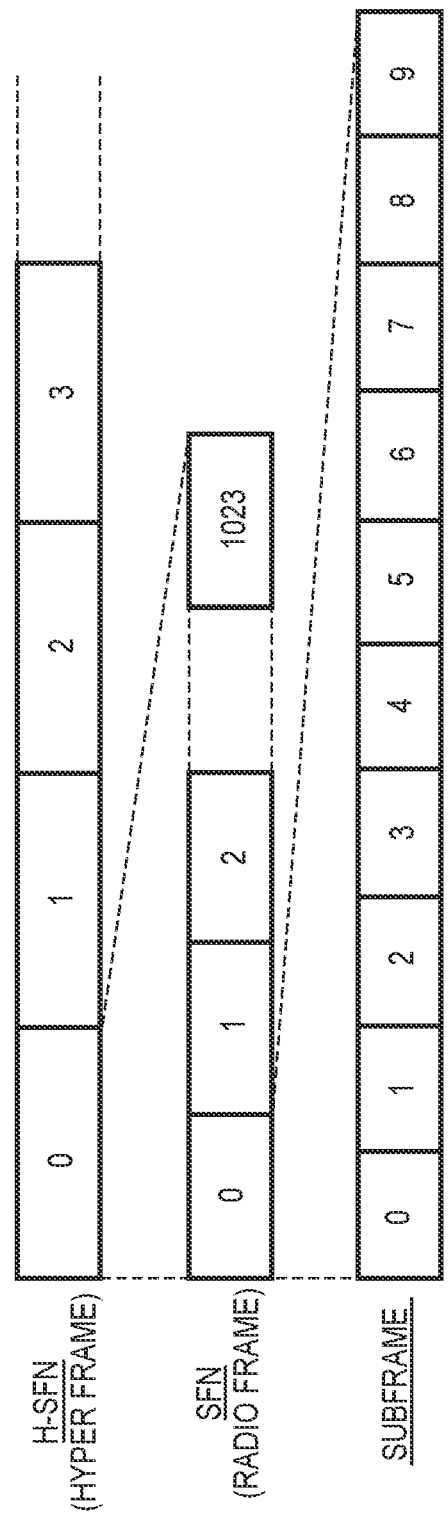

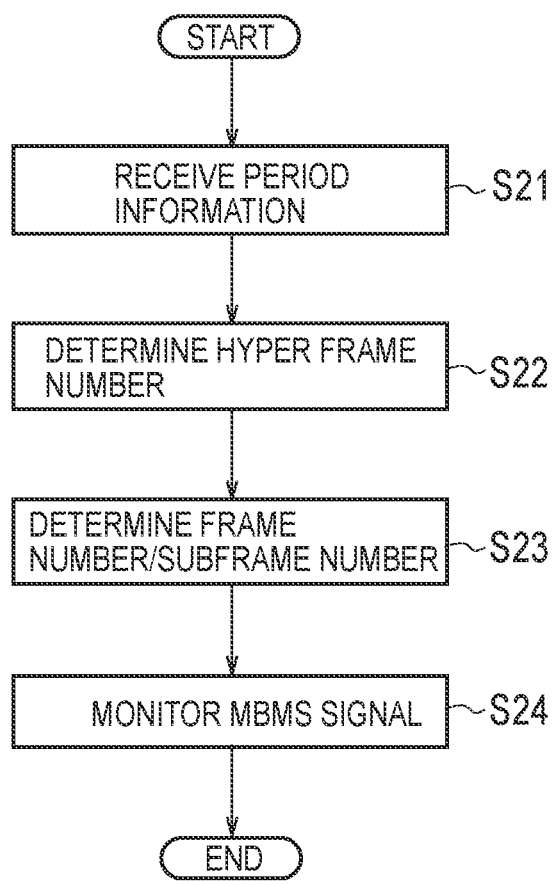

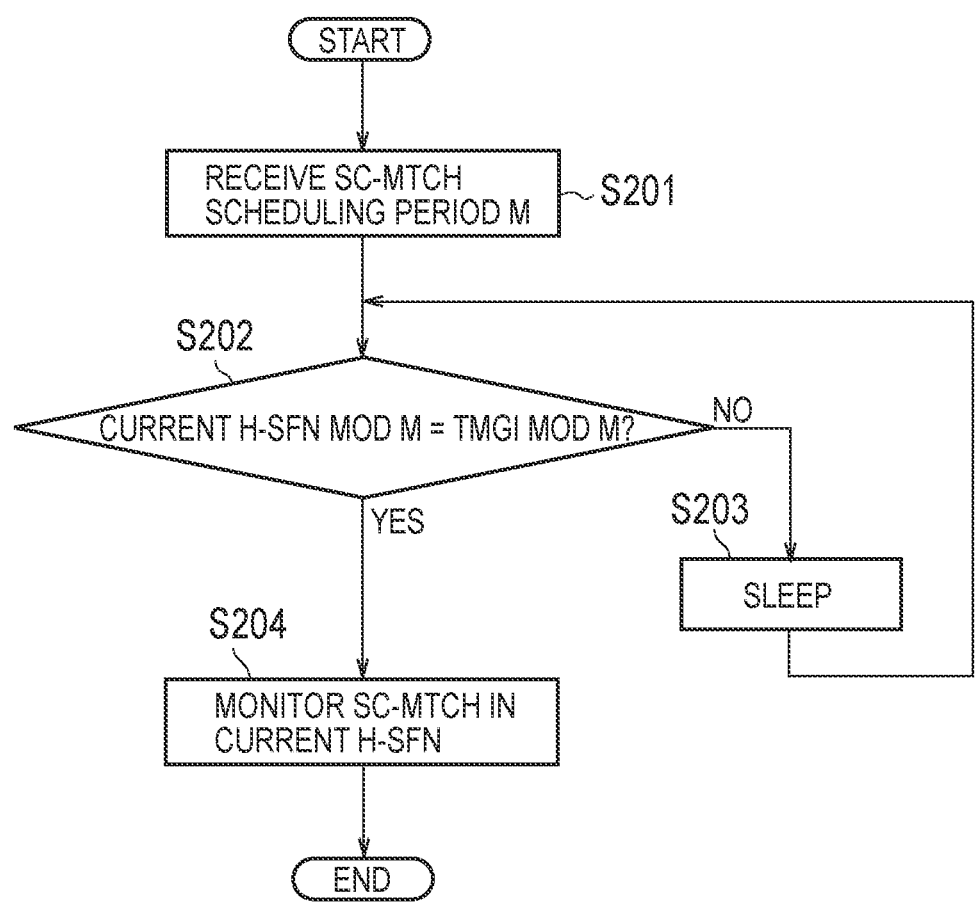

FIG. 24

```
sc-mcch-ModificationPeriod-r13 ENUMERATED (rf2, rf4, rf8, rf16, rf32, rf64, rf128,
rf256,
                                rf512, rf1024, rf2048, rf4096, rf8192,
rf16384, rf32768,                                  rf65536,
```

FIG. 26

```
sc-mcch-RepetitionPeriod-r13    ENUMERATED {rf2, rf4, rf8, rf16, rf32, rf64, rf128, rf256},
```

FIG. 30

```
SC-MTCH-InfoList-r13 ::=            SEQUENCE (SIZE (0..maxSC-MTCH-r13)) OF SC-
MTCH-Info-r13

SC-MTCH-Info-r13 ::=                SEQUENCE {
mbmsSessionInfo-r13                     MBMSSessionInfo-r13,
g-RNTI-r13                              BIT STRING(SIZE(16)),
sc-mtch-schedulingInfo-r13              SC-MTCH-SchedulingInfo-r13
    OPTIONAL,   -- Need OP
sc-mtch-neighbourCell-r13               BIT  STRING  (SIZE(maxNeighCell-SCPTM-
r13)) OPTIONAL,   -- Need OP
...
[[  sc-mtch-neighbourCell-BL-r14        BIT    STRING    (SIZE(maxNeighCell-
SCPTM-r13)) OPTIONAL,    -- Need OP
sc-mtch-neighbourCell-NB-r14         BIT  STRING  (SIZE(maxNeighCell-SCPTM-
r13))   OPTIONAL,   -- Need OP
]],
}
```

FIG. 31

```
SCPTM-NeighbourCellList-r13 ::=     SEQUENCE   (SIZE   (1..maxNeighCell-SCPTM-
r13)) OF PCI-ARFCN-r13

PCI-ARFCN-r13 ::=                   SEQUENCE {
physCellId-r13                          PhysCellId,
carrierFreq-r13                         ARFCN-ValueEUTRA-r9    OPTIONAL
NarrowbandOperation-r14             ENUMERATED {true}        OPTIONAL
carrierFreqOffset-r14               ENUMERATED {
v-10,v-9,v-8,v-7,v-6,v-5,v-4,v-3,v-2,v-1,v-0dot5,
v0,  v1, v2,v3,  v4,   v5,  v6,  v7,  v8,  v9
}   OPTIONAL
}
```

RADIO TERMINAL AND BASE STATION

RELATED APPLICATION

This application is a continuation application of international application PCT/JP2017/039609, filed Nov. 1, 2017, which claims the benefit of U.S. Provisional Application No. 62/417,519, filed on Nov. 4, 2016, the entire contents of which are incorporated herein by reference.

TECHNICAL FIELD

The present invention relates to a radio terminal and a base station for a mobile communication system.

BACKGROUND ART

In 3GPP (Third Generation Partnership Project), which is a project aiming to standardize a mobile communication system, the specifications of MBMS (Multimedia Broadcast Multicast Service) transmission have been laid out to provide a radio terminal with a multicast/broadcast service. Schemes for MBMS include two schemes: MBSFN (Multicast Broadcast Single Frequency Network) and SC-PTM (Single Cell Point-To-Multipoint).

Meanwhile, radio terminals for MTC (Machine Type Communication) and IoT (Internet of Things) services, which perform communication without human intervention, have been studied. Such a radio terminal is required to achieve low cost, wide coverage area, and low power consumption. For this reason, in 3GPP, a category for radio terminals having a transmission and reception bandwidth limited to just a part of the system bandwidth (system transmission and reception band) is specified. An enhanced coverage function including repetition and the like is applied to a radio terminal in such a new category.

SUMMARY

A radio terminal according to one embodiment is a radio terminal for a mobile communication system supporting MBMS transmission using SC-PTM. The radio terminal comprises: a controller configured to discontinuously monitor MBMS control information transmitted from a base station via SC-MCCH; and a receiver configured to receive, from the base station, information indicating an SC-MCCH modification period in which a content of the MBMS control information transmitted via the SC-MCCH can be modified. The SC-MCCH modification period has a time length equal to or longer than a hyper frame including a plurality of radio frames. The controller determines a hyper frame number and a frame number corresponding to an SC-MCCH modification boundary, based on the SC-MCCH modification period, in accordance with: (1024×H-SFN+SFN) mod M=0, where the "H-SFN" indicates a hyper frame number corresponding to the SC-MCCH modification boundary, the "SFN" indicates a frame number corresponding to the SC-MCCH modification boundary, and the "M" indicates the SC-MCCH modification period.

A base station according to one embodiment is a base station for a mobile communication system supporting MBMS transmission using SC-PTM. The base station comprises a transmitter configured to transmit, to a radio terminal, MBMS control information via SC-MCCH; and a controller configured to notify the radio terminal of information indicating an SC-MCCH modification period in which a content of the MBMS control information transmitted via the SC-MCCH can be modified. The SC-MCCH modification period has a time length equal to or longer than a hyper frame including a plurality of radio frames. An SC-MCCH modification boundary is determined in accordance with (1024×H-SFN+SFN) mod M=0, where the "H-SFN" indicates a hyper frame number corresponding to the SC-MCCH modification boundary, the "SFN" indicates a frame number corresponding to the SC-MCCH modification boundary, and the "M" indicates the SC-MCCH modification period.

A radio terminal according to one embodiment is a radio terminal for a mobile communication system supporting MBMS transmission using SC-PTM. The radio terminal comprises: a receiver configured to receive an MBMS service from a base station via SC-MTCH; and a controller. The receiver receives, from the base station, MAC CE indicating a suspension of transmission of the MBMS service via the SC-MTCH. The controller determines that the transmission of the MBMS service via the SC-MTCH is suspended in response to the reception of the MAC CE.

A base station according to one embodiment is a base station for a mobile communication system supporting MBMS transmission using SC-PTM. The base station comprises: a transmitter configured to transmit an MBMS service via SC-MTCH. The transmitter further transmits, to the radio terminal, MAC CE indicating a suspension of the transmission of the MBMS service via the SC-MTCH.

BRIEF DESCRIPTION OF THE DRAWINGS

FIG. 9 is a diagram illustrating an SIB 20 according to the embodiment.

FIG. 10 is a diagram illustrating MBMS control information in the SC-MCCH according to the embodiment.

FIG. 11 is a diagram illustrating a downlink physical channel for an eMTC UE according to the embodiment.

FIG. 12 is a flowchart illustrating a random access procedure for an eMTC UE and an NB-IoT UE.

FIG. 13 is a flowchart illustrating an example of an operation flow of a UE according to a first embodiment.

FIGS. 14A and 14B are diagrams illustrating an operation pattern 1 of the first embodiment.

FIGS. 15A, 15B and 15C are diagrams illustrating an operation pattern 2 of the first embodiment.

FIG. 16 is a diagram illustrating a relationship between a hyper frame, a radio frame, and a subframe.

FIG. 17 is a flowchart illustrating an example of an operation flow of a UE according to a second embodiment.

FIG. 18 is a flowchart illustrating an operation pattern 1 of the second embodiment.

FIG. 24 is a diagram according to the supplementary note.
FIG. 26 is a diagram according to the supplementary note.
FIG. 30 is a diagram according to the supplementary note.
FIG. 31 is a diagram according to the supplementary note.

DESCRIPTION OF THE EMBODIMENT (Mobile Communication System)

Figure 1:
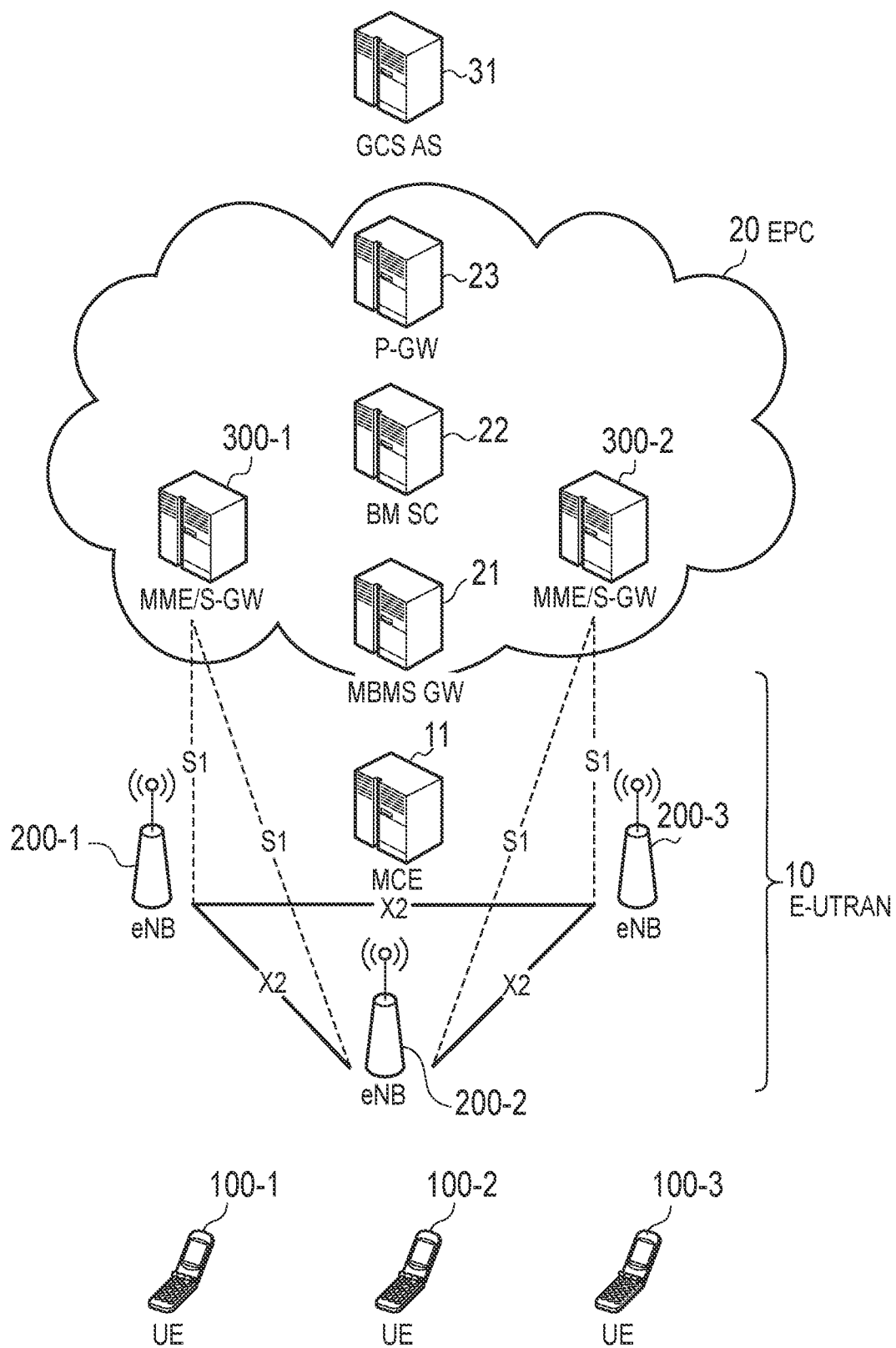
FIG. 1 is a diagram illustrating a configuration of an LTE system according to an embodiment.
Figure 2:
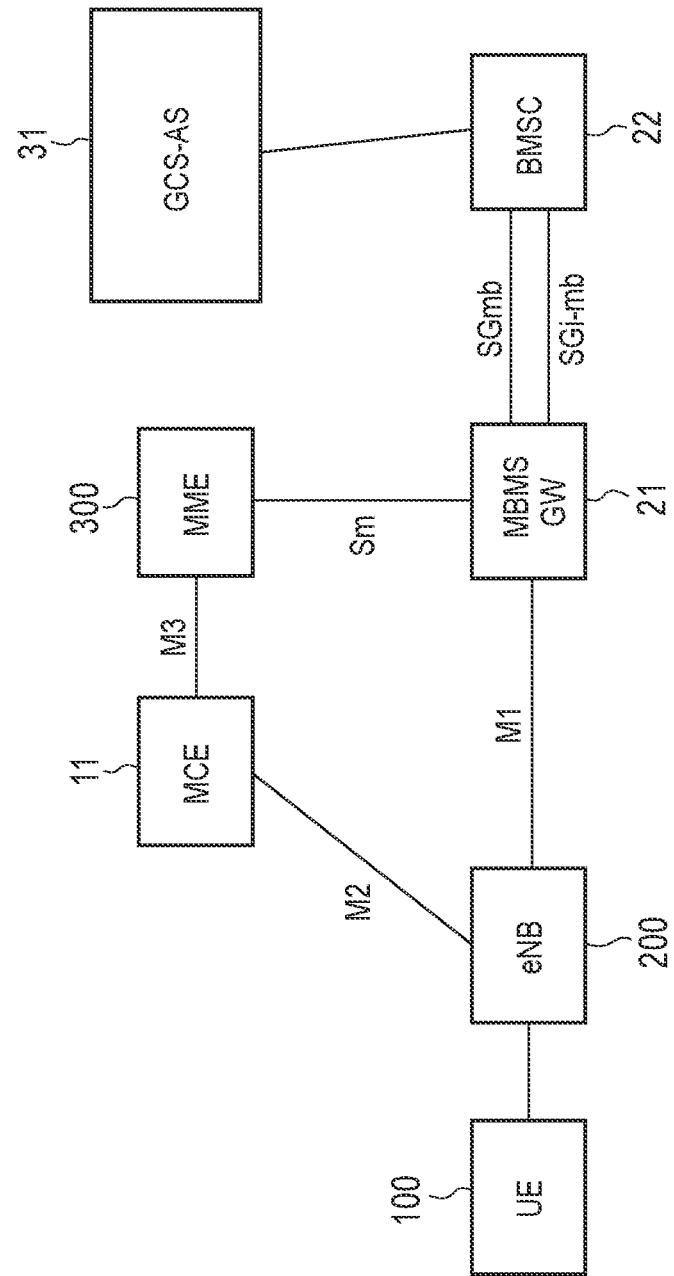
FIG. 2 is a diagram illustrating a network configuration for MBMS according to the embodiment.

The configuration of the mobile communication system according to the embodiment will be described. The mobile communication system according to the embodiment is an LTE (Long Term Evolution) system whose specifications are defined in 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 configure a network of the LTE system.

The UE 100 is a mobile communication device. The UE 100 performs radio communication with the eNB 200 that manages the cell (serving cell) in which the UE 100 exists.

The E-UTRAN 10 includes base stations (evolved Node-Bs) 200. The eNBs 200 are connected to each other via an X2 interface. The eNB 200 manages one or a plurality of cells and performs radio communication with the UE 100 that has established connection with a cell of the eNB 200. The eNB 200 has a radio resource management (RRM) function, a routing function of user data (hereinafter referred to simply as "data"), a measurement control function for mobility control/scheduling, and the like. "Cell" is used as a term indicating the smallest unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW 300 is connected to the eNB 200 via an S1 interface.

Network entity for MBMS will be described. The E-UTRAN 10 includes an MCE (Multi-Cell/Multicast Coordinating Entity) 11. The MCE 11 is connected to the eNB 200 via an M2 interface. The MCE is connected to the MME 300 via an M3 interface (see FIG. 2). The MCE 11 performs MBSFN radio resource management/allocation and the like. Specifically, the MCE 11 performs scheduling of MBSFN. On the other hand, the scheduling of the SC-PTM is performed by the eNB 200.

The EPC 20 includes an MBMS GW (MBMS Gateway) 21. The MBMS GW 21 is connected to the eNB 200 via an M1 interface. The MBMS GW 21 is connected to the MME 300 via an Sm interface. The MBMS GW 21 is connected to the BM-SC 22 via an SG-mb and SGi-mb interfaces (see FIG. 2). The MBMS GW 21 performs IP multicast data transmission, session control and the like to the eNB 200.

The EPC 20 includes a BM-SC (Broadcast Multicast Service Center) 22. The BM-SC 22 is connected to the MBMS GW 21 via the SG-mb and SGi-mb interfaces. The BM-SC 22 is connected to the P-GW 23 via an SGi interface (see FIG. 2). The BM-SC 22 manages and allocates TMGI (Temporary Mobile Group Identity) and the like.

Further, a GCS AS (Group Communication Service Application Server) 31 is provided in a network (that is, the Internet) outside the EPC 20. The GCS AS 31 is an application server for group communication. The GCS AS 31 is connected to the BM-SC 22 via an MB2-U interface and an MB 2-C interface. The GCS AS 31 is connected to the P-GW 23 via the SGi interface. The GCS AS 31 performs management of groups and data distribution etc. in group communication.

Figure 3:
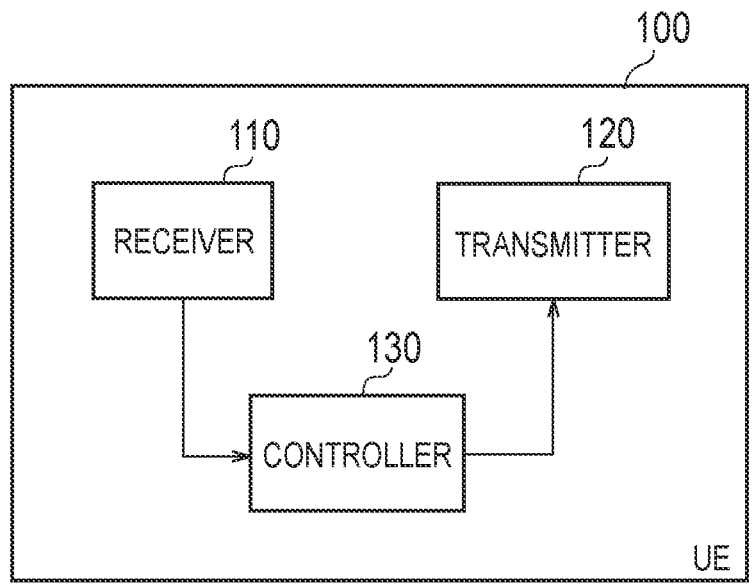
FIG. 3 is a diagram illustrating a configuration of a UE (radio terminal) according to the embodiment.

FIG. 3 is a diagram illustrating the configuration of the UE 100 (radio terminal) according to the embodiment. As illustrated in FIG. 3, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal) and outputs the baseband signal to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal and transmits the radio signal from the antennas.

The controller 130 performs various controls in the UE 100. The controller 130 includes a processor and a memory. The memory stores programs executed by the processor and information used for processing by the processor. The processor includes a baseband processor that performs modulation and demodulation, encoding, decoding, and the like of the baseband signal and a CPU (Central Processing Unit) that performs various processes by executing programs stored in the memory. The processor may include a codec that performs encoding/decoding audio/video signals. The processor executes various processes to be described later.

Figure 4:
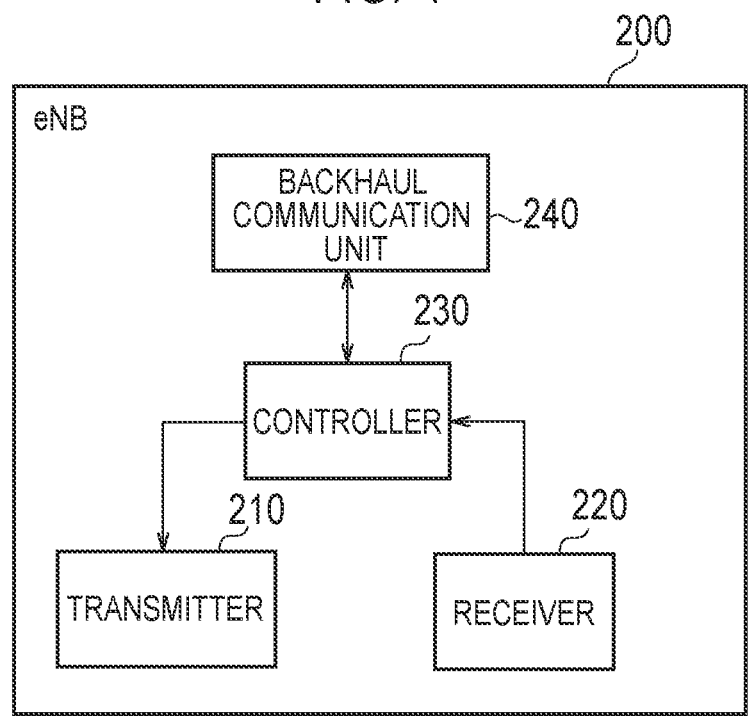
FIG. 4 is a diagram illustrating a configuration of an eNB (base station) according to the embodiment.

FIG. 4 is a diagram illustrating a configuration of an eNB (base station) according to the embodiment. As illustrated in FIG. 4, the eNB 200 includes a transmitter 210, a receiver 220, a controller 230, and a backhaul communication unit 240.

The transmitter 210 performs various transmissions under the control of the controller 230. The transmitting unit 210 includes antennas and a transmitting machine. The transmitting machine converts a baseband signal (transmission signal) outputted by the controller 230 into a radio signal and transmits the radio signal from the antennas.

The receiver 220 performs various types of reception under the control of the controller 230. The receiver 220 includes antennas and a receiving machine. The receiving machine converts the radio signal received by the antennas into a baseband signal (received signal) and outputs the baseband signal to the controller 230.

The controller 230 performs various controls in the eNB 200. The controller 230 includes a processor and a memory. The memory stores programs executed by the processor and information used for processing by the processor. The processor includes a baseband processor that performs modulation and demodulation, encoding, decoding, and the like of the baseband signal and a CPU that performs various processes by executing programs stored in the memory. The processor executes various processes to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like. The backhaul communication unit 240 can also be used for communication on the M1 interface and for communication on the M2 interface.

Figure 5:
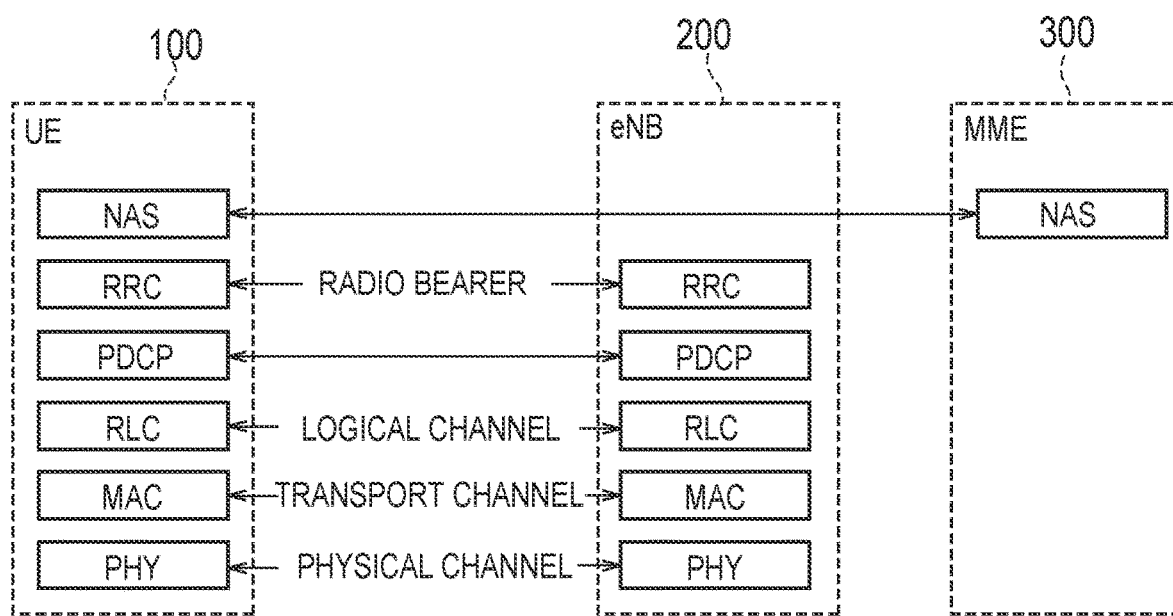
FIG. 5 is a diagram illustrating a protocol stack of a radio interface in the LTE system according to the embodiment.

FIG. 5 is a diagram illustrating a protocol stack of a radio interface in the LTE system. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by HARQ (Hybrid ARQ), and the like. Between the MAC layer of the UE 100 and the MAC layer of the eNB 200, data and control signals are transmitted via the transport channel. The MAC layer of the eNB 200 includes a scheduler. The scheduler determines the uplink and downlink transport format (Transport Block Size, Modulation and Coding Scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various configurations are transmitted between the RRC layer of the UE 100 and the RRC layer of the eNB 200. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in an RRC connected state, otherwise the UE 100 is in an RRC idle state.

The NAS (Non-Access Stratum) layer located above the RRC layer performs session management, mobility management, and the like.

Figure 6A:
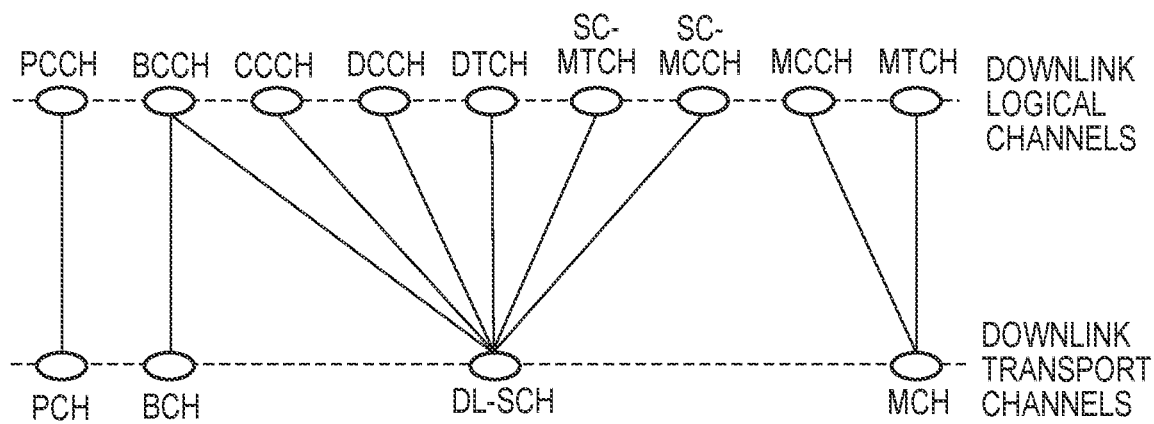
FIGS. 6A and 6B are diagrams illustrating a channel configuration of a downlink of the LTE system according to the embodiment.

FIG. 6 is a diagram illustrating a channel configuration of downlink of the LTE system. FIG. 6(a) illustrates mapping between a logical channel (Downlink Logical Channel) and a transport channel (Downlink Transport Channel).

As illustrated in FIG. 6(a), PCCH (Paging Control Channel) is a logical channel for notifying paging information and system information change. The PCCH is mapped to PCH (Paging Channel) that is a transport channel.

BCCH (Broadcast Control Channel) is a logical channel for system information. The BCCH is mapped to BCH (Broadcast Control Channel) and a DL-SCH (Downlink Shared Channel), both of which are transport channels.

CCCH (Common Control Channel) is a logical channel for transmission control information between the UE 100 and the eNB 200. The CCCH is used if the UE 100 does not have an RRC connection with the network. The CCCH is mapped to the DL-SCH.

DCCH (Dedicated Control Channel) is a logical channel for transmitting individual control information between the UE 100 and the network. The DCCH is used if the UE 100 has an RRC connection. The DCCH is mapped to the DL-SCH.

DTCH (Dedicated Traffic Channel) is an individual logical channel for data transmission. The DTCH is mapped to the DL-SCH.

SC-MTCH (Single Cell Multicast Traffic Channel) is a logical channel for SC-PTM. The SC-MTCH is a point-to-multipoint downlink channel for multicast transmitting data (MBMS) from the network to the UE 100 by using the SC-PTM.

SC-MCCH (Single Cell Multicast Control Channel) is a logical channel for SC-PTM. The SC-MCCH is a point-to-multipoint downlink channel for multicast transmitting MBMS control information for one or more SC-MTCHs from the network to the UE 100. The SC-MCCH is used for a UE 100 that is to receive an MBMS using SC-PTM or that is interested in the reception. Further, there is only one SC-MCCH in one cell.

MCCH (Multicast Control Channel) is a logical channel for MBSFN. The MCCH is used for transmitting MBMS control information for MTCH from the network to the UE 100. The MCCH is mapped to an MCH (Multicast Channel) that is a transport channel.

MTCH (Multicast Traffic Channel) is a logical channel for MBSFN. The MTCH is mapped to the MCH.

Figure 6B:
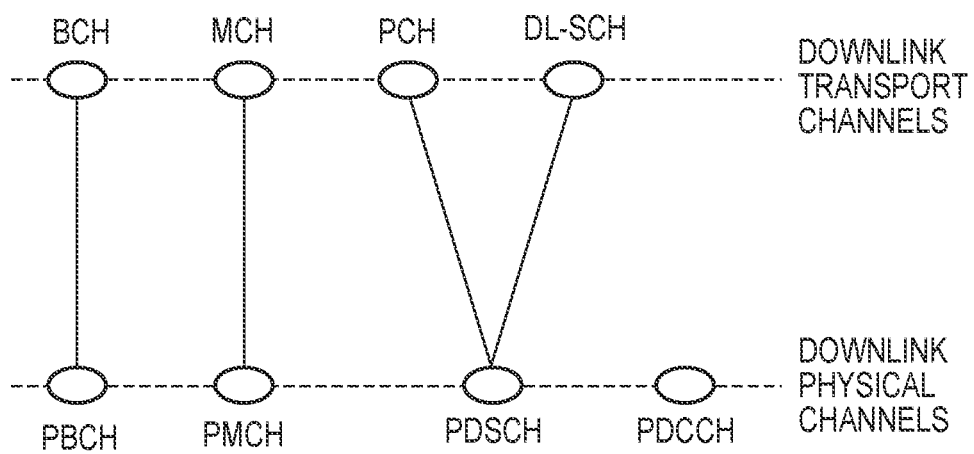

FIG. 6(b) illustrates mapping between a transport channel (Downlink Transport Channel) and a physical channel (Downlink Physical Channel).

As illustrated in FIG. 6(b), the BCH is mapped to PBCH (Physical Broadcast Channel).

The MCH is mapped to PMCH (Physical Multicast Channel). The MCH supports MBSFN by a plurality of cells.

The PCH and the DL-SCH are mapped to PDSCH (Physical Downlink Shared Channel). The DL-SCH supports HARQ, link adaptation, and dynamic resource allocation.

PDCCH carries resource allocation information of the PDSCH (DL-SCH, PCH), HARQ information on the DL-SCH, and the like. Further, the PDCCH carries an uplink scheduling grant.

Figure 7:
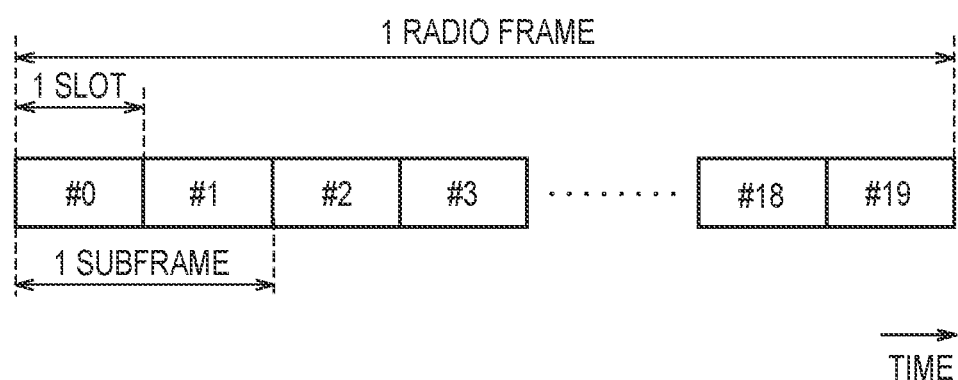
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 7, the radio frame includes ten subframes arranged in a time direction. Each of the subframes includes two slots arranged in the time direction. Each of the subframes has a length of 1 ms and each of the slots has a length of 0.5 ms. Each of the subframes includes a plurality of resource blocks (RBs) in a frequency direction, and a plurality of symbols in the time direction. Each of the resource blocks includes a plurality of subcarriers in the frequency direction. One resource element (RE) includes one symbol and one subcarrier. Further, of radio resources (time and frequency resources) to be allocated to a UE 100, the frequency resource can be identified by a resource block, and the time resource can be identified by a subframe (or a slot).

In the downlink, a section including several symbols at the head of each of the subframes is a region used as the PDCCH for mainly transmitting a downlink control signal. Furthermore, the remaining portion of each of the subframes is a region available as the PDSCH for mainly transmitting downlink data. Further, in the downlink, an MBSFN subframe that is a subframe for MBSFN may be set.

In the uplink, both ends in the frequency direction of each subframe are regions used as the PUCCH for mainly transmitting a uplink control signal. The remaining portion of each subframe is a region available as the PUSCH for mainly transmitting uplink data.

(Outline of SC-PTM)

Next, outline of SC-PTM will be described. Radio transmission schemes for MBMS include two schemes: MBSFN and SC-PTM. In the MBSFN, data is transmitted via the PMCH for each MBSFN area including a plurality of cells. In contrast, in the SC-PTM, data is transmitted via the PDSCH for each cell. In the following, a scenario in which the UE 100 performs SC-PTM reception is mainly assumed. However, MBSFN may be assumed.

The UE 100 may receive the MBMS service in the RRC connected state or may receive the MBMS service in the RRC idle state. In the following, it is mainly assumed that the UE 100 receives the MBMS service in the RRC idle state.

Figure 8:
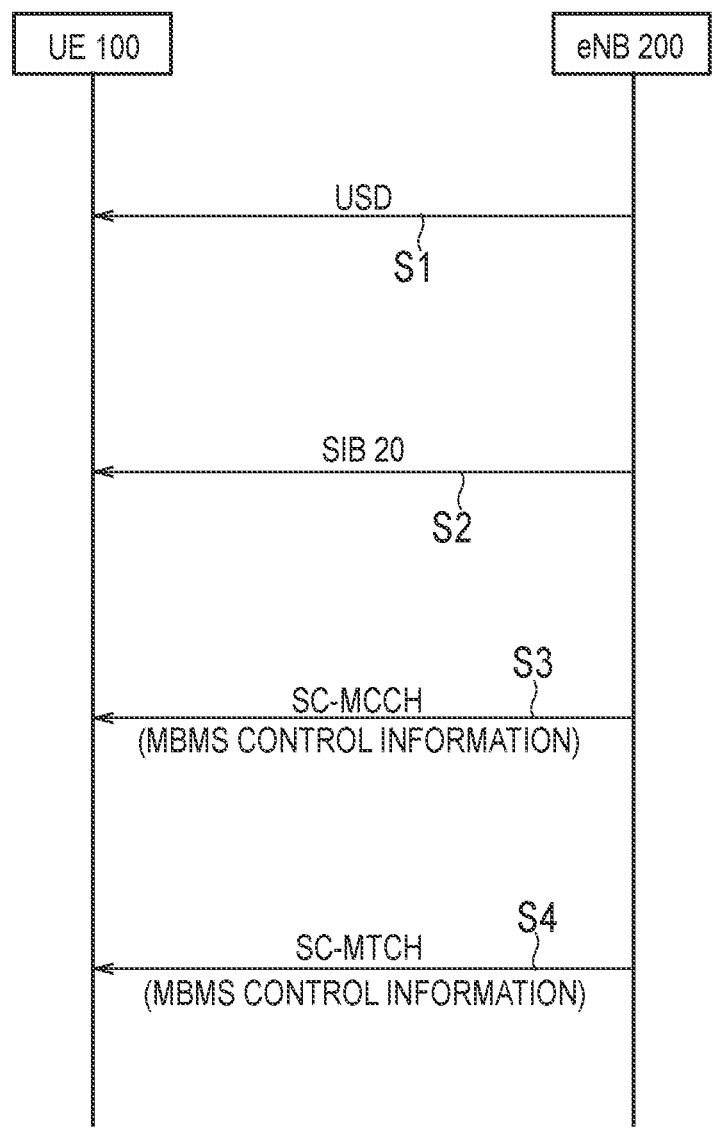
FIG. 8 is a flowchart illustrating an operation example of SC-PTM according to the embodiment.

FIG. 8 is a diagram illustrating an operation example of SC-PTM.

As illustrated in FIG. 8, in step S1, the UE 100 acquires a USD (User Service Description) from the EPC 20 via the eNB 200. The USD provides basic information on each MBMS service. For each MBMS service, the USD includes a TMGI for identifying the MBMS service, a frequency at which the MBMS service is provided, and a provision start/end time of the MBMS service.

In step S2, the UE 100 receives a SIB 20 from the eNB 200 via the BCCH. The SIB 20 includes information (scheduling information) necessary for acquiring the SC-MCCH. FIG. 9 is a diagram illustrating the SIB 20. As illustrated in FIG. 9, the SIB 20 includes sc-mcch-ModificationPeriod representing a cycle in which the content of the SC-MCCH can be changed, sc-mcch-RepetitionPeriod representing a transmission (retransmission) cycle of the SC-MCCH in the number of radio frames, sc-mcch-Offset representing a scheduled radio frame offset of the SC-MCCH, sc-mcch-Subframe representing a subframe in which the SC-MCCH is scheduled, and so forth.

In step S3, the UE 100 receives MBMS control information from the eNB 200 via the SC-MCCH, based on the SIB 20. MBMS control information may be also called SCPTM configuration information (SCPTM Configuration). For the SC-MCCH transmission in the physical layer, an SC-RNTI (Single Cell RNTI) is used. FIG. 10 is a diagram illustrating the MBMS control information (SC-PTM configuration information) in the SC-MCCH. As illustrated in FIG. 10, the SC-PTM configuration information includes control information applicable to the MBMS service, which is transmitted via SC-MRB (Single Cell MBMS Point to Multipoint Radio Bearer). The SC-PTM configuration information includes sc-mtch-InfoList containing configuration for each SC-MTCH in the cell transmitting that information, and scptmNeighbourCellList being a list of neighbour cells providing the MBMS service via the SC-MRB. The sc-mtch-InfoList contains one or more pieces of SC-MTCH-Info. Each piece of the SC-MTCH-Info contains information on an ongoing MBMS session (mbmsSessionlnfo) to be transmitted via the SC-MRB, a G-RNTI (Group RNTI) corresponding to the MBMS session, and sc-mtch-schedulinglnfo being DRX information for the SC-MTCH. The mbmsSessionlnfo contains a TMGI and a session ID (sessionId) to identify the MBMS service. The G-RNTI is an RNTI to identify a multicast group (specifically, SC-MTCH addressed to a specific group). The G-RNTI is mapped to the TMGI on a one-to-one basis. The sc-mtch-schedulingInfo contains onDurationTimerSCPTM, drx-InactivityTimerSCPTM, and schedulingPeriodStartOffsetSCPTM. The schedulingPeriodStartOffsetSCPTM contains SC-MTCH-SchedulingCycle and SC-MTCH-SchedulingOffset.

In step S4, the UE 100 receives the MBMS service (MBMS data) corresponding to the TMGI, in which the UE 100 itself is interested, via the SC-MTCH, based on SC-MTCH-Schedulinglnfo in the SC-PTM configuration information. In the physical layer, the eNB 200, after transmitting the PDCCH by using the G-RNTI, transmits the MBMS data via the PDSCH.

It should be noted that the control signal (signaling) described with reference to FIG. 8 is an example. Due to optimization for power saving reception or the like, part of the control signals may be omitted or the order of the control signals may be changed.

(Outline of eMTC and NB-IoT)

Next, outline of eMTC and NB-IoT will be described. In the embodiment, a scenario where a UE 100 in a new category exists is assumed. The UE 100 in the new category is a UE 100 whose transmission and reception bandwidth is limited only to a part of the system transmission and reception band. The new UE category is referred to as, for example, category M1 and NB (Narrow Band)-IoT category. Here, the category M1 is an eMTC (enhanced Machine Type Communications) UE. The NB-IoT UE is category NB1. The category M1 limits the transmission and reception bandwidth of the UE 100 to 1.08 MHz (that is, the bandwidth of six resource blocks) and supports an enhanced coverage (EC) function using repetition and the like. The NB-IoT category further limits the transmission and reception bandwidth of the UE 100 to 180 kHz (that is, the bandwidth of one resource block) and supports the enhanced coverage function. Repetition is a technique of repeatedly transmitting the same signal using a plurality of subframes. As an example, the system bandwidth of the LTE system is 10 MHz, of which the transmission and reception bandwidth is 9 MHz (that is, the bandwidth of 50 resource blocks). On the other hand, the UE 100 in the M1 category cannot receive normal PDCCH because it cannot receive a downlink radio signal transmitted with a wider bandwidth than six resource blocks. For this reason, MPDCCH (MTC-PDCCH) being PDCCH for MTC is introduced. For the same reason, NPDCCH (NB-PDCCH) being PDCCH for NB-IoT is introduced.

FIG. 11 is a diagram illustrating a downlink physical channel for the eMTC UE. As illustrated in FIG. 11, the eNB 200 transmits MPDCCH within six resource blocks. The MPDCCH includes scheduling information for allocating PDSCH. As an example, the MPDCCH allocates PDSCH of a subframe different from the subframe in which MPDCCH is transmitted. The eNB 200 transmits the PDSCH within six resource blocks. Further, the eNB 200 allocates PDSCHs to a plurality of subframes in order to perform repetition of the same signal. The UE 100 in category M1 identifies the allocated PDSCH by receiving the MPDCCH and receives data transmitted with the allocated PDSCH.

FIG. 12 is a flowchart illustrating a random access procedure for an eMTC UE and an NB-IoT UE. In an initial state of FIG. 12, the UE 100 is in the RRC idle state. The UE 100 performs a random access procedure for transiting to the RRC connected state.

The UE 100 selects a cell of the eNB 200 as a serving cell. The UE 100 may, if a first cell selection criteria for normal coverage (first S-criteria) is not satisfied, and a second cell selection criteria for enhanced coverage (second S-criteria) is satisfied, determine that the UE 100 is in an enhanced coverage. A "UE in an enhanced coverage" means a UE that is required to use the enhanced coverage function (the enhanced coverage mode) to access a cell. It is noted that it is mandatory for the eMTC UE to use the enhanced coverage mode.

As illustrated in FIG. 12, in step S1001, the eNB 200 transmits PRACH (Physical Random Access Channel) related information by broadcast signaling (for example, SIB). The PRACH related information includes various parameters provided for each enhanced coverage level. As an example, a total of four levels of the enhanced coverage level, enhanced coverage levels 0 to 3 are defined. The various parameters include an RSRP (Reference Signal Received Power) threshold value, a PRACH resource, and the maximum preamble transmission number. The PRACH resource includes a radio resource (a time-frequency resource) and a signal sequence (a preamble sequence). The UE 100 stores the received PRACH related information.

In step S1002, the UE 100 measures the RSRP based on a reference signal transmitted from the eNB 200.

In step S1003, the UE 100 determines the enhanced coverage level of the UE 100 by comparing the measured RSRP with the RSRP threshold value for each enhanced coverage level. The enhanced coverage level indicates the degree of enhanced coverage required for the UE 100. The enhanced coverage level is related at least to the number of transmissions in repetition (that is, repetition count).

In step S1004, the UE 100 selects a PRACH resource corresponding to the enhanced coverage level of the UE 100.

In step S1005, the UE 100 transmits an Msg 1 (random access preamble) to the eNB 200 using the selected PRACH resource. The eNB 200 identifies the enhanced coverage level of the UE 100 based on the PRACH resource used for the received Msg 1.

In step S1006, the eNB 200 transmits, to the UE 100, an Msg 2 (random access response) including scheduling information indicating the PUSCH resource allocated to the UE 100. It is noted that until the UE 100 properly receives the Msg 2, the UE 100 can transmit the Msg 1 a plurality of times up to the maximum preamble transmission number corresponding to the enhanced coverage level of the UE 100.

In step S1007, the UE 100 transmits an Msg 3 to the eNB 200 based on the scheduling information. The Msg 3 may be an RRC Connection Request message.

In step S1008, the eNB 200 transmits an Msg 4 to the UE 100.

In step S1009, the UE 100 transits to an RRC connected state in response to the reception of the Msg 4. Thereafter, the eNB 200 controls the repetition to the UE 100 based on the identified enhanced coverage level.

First Embodiment

A first embodiment will be described below while the mobile communication system as described above is assumed. In the first embodiment, a scenario is assumed in which batch delivery of firmware and the like is performed by MBMS using SC-PTM to the UE 100 in the RRC idle state. The UE 100 may be the new category of a UE described above.

In the first embodiment, the eNB 200 (transmitter 210) periodically transmits an MBMS signal to the UE 100 via the SC-MCCH or the SC-MTCH. The MBMS signal includes at least one of MBMS control information (SC-PTM setting information) transmitted via the SC-MCCH and MBMS data transmitted via the SC-MTCH. The SC-MCCH and the SC-MTCH are logical channels for SC-PTM. The eNB 200 (controller 230) notifies the UE 100 of notification information indicating a future timing at which the UE 100 should receive the MBMS signal. A monitoring unnecessary period may have a time length longer than a transmission period of the MBMS signal. The UE 100 (controller 130) monitors the MBMS signal periodically transmitted from the eNB 200 via the SC-MCCH or the SC-MTCH. The UE 100 (receiver 110) receives the notification information from the eNB 200. Based on the notification information, the UE 100 (controller 130) specifies the monitoring unnecessary period during which monitoring of the MBMS signal can be omitted. Since the UE 100 (controller 130) can omit the monitoring of the MBMS signal in the monitoring unnecessary period, it is possible to reduce a power consumption of the UE 100 caused along with the SC-PTM reception.

It is noted that in the first embodiment, the eNB 200 (transmitter 210) may transmit the MBMS signal using the enhanced coverage function for enhancing a coverage of the eNB 200. Further, a level of the enhanced coverage may be different for each MBMS service (TMGI). The enhanced coverage function may include repetition for repeatedly transmitting the same signal. As a repetition count increases, the coverage can be enhanced. The enhanced coverage function may include power boosting for increasing a power density of the transmitted signal. As an example, the power density is increased by narrowband transmission for narrowing the frequency bandwidth of the transmitted signal. As the power density of the transmitted signal increases, the coverage can be enhanced. The enhanced coverage function may include lower MCS transmission for lowering the MCS used for the transmitted signal. The coverage can be enhanced by performing the transmission using the MCS with a low data rate and a high error resilience.

FIG. 13 is a flowchart illustrating an example of an operation flow of the UE 100 according to the first embodiment. As illustrated in FIG. 13, in step S11, the UE 100 (receiver 110) receives from the eNB 200 the notification information indicating a future timing at which the UE 100 should receive the MBMS signal. The notification information may be associated with an identifier (TMGI) of the MBMS service. In step S12, the UE 100 (controller 130) specifies the monitoring unnecessary period, based on the notification information. The UE 100 (controller 130) may specify the monitoring unnecessary period corresponding to the MBMS service that the UE 100 is receiving or interested in receiving. In step S13, the UE 100 (controller 130) omits the monitoring of the MBMS signal, in the monitoring unnecessary period. In step S14, after an elapse of the monitoring unnecessary period, the UE 100 monitors the MBMS signal and receives the MBMS signal from the eNB 200.

FIG. 14 is a diagram illustrating an operation pattern 1 of the first embodiment. In the operation pattern 1 of the first embodiment, the notification information includes information indicating the future timing at which a content of the MBMS control information (hereinafter, referred to as "SC-MCCH information") transmitted via the SC-MCCH is modified. The monitoring unnecessary period is a period until the future timing when the content of the SC-MCCH information is modified. The monitoring unnecessary period according to the operation pattern 1 of the first embodiment is referred to as "SC-MCCH monitoring unnecessary period".

As illustrated in FIG. 14(a), the eNB 200 periodically transmits the SC-MCCH information via the SC-MCCH. The transmission period (Repetition Period) of the SC-MCCH information is set by sc-mcch-RepetitionPeriod or parameter in the SIB 20, and is an integral multiple of the radio frame. Further, the eNB 200 may modify the SC-MCCH information at a boundary of an SC-MCCH modification period. The SC-MCCH modification period is set by sc-mcch-ModificationPeriod or parameter in the SIB 20, and is an integral multiple of the radio frame. In an example illustrated in FIG. 14, a section from times t0 to t6 corresponds to one SC-MCCH modification period, and a section from times t6 to t12 corresponds to a next SC-MCCH modification period.

The eNB 200 may transmit the same SC-MCCH information for each transmission period (Repetition Period) within the SC-MCCH modification period. When modifying the SC-MCCH information of a certain SC-MCCH modification period, the eNB 200 transmits a modification notification to the UE 100 in a predetermined subframe used for the SC-MCCH within the SC-MCCH modification period. Upon receiving the modification notification from the eNB 200, the UE 100 interested in the SC-PTM reception obtains new SC-MCCH information within the SC-MCCH modification period. Until the UE 100 obtains the new SC-MCCH information, the UE 100 applies the previously acquired SC-MCCH information. If the SC-MCCH information is not modified, the UE 100 can reduce the power consumption by omitting the monitoring of the SC-MCCH (for example, by turning off a receiver unit).

However, in a method using such a modification notification, the UE 100 needs to perform reception at least once within each SC-MCCH modification period.

In the operation pattern 1 of the first embodiment, the eNB 200 (controller 230) notifies the UE 100 of the notification information including timing information indicating a timing at which the SC-MCCH information is modified next. The eNB 200 (controller 230) may include the notification information into BCCH (SIB 20) or may include the notification information into SC-MCCH (SC-MCCH information). The timing information may be information directly indicating the modification timing of the SC-MCCH information or information relatively indicating a modification timing based on the current timing. The timing information may be designated in units of radio frame (SFN: System Frame Number), units of hyper frame (H-SFN: Hyper System Frame Number), or units of SC-MCCH modification period. The UE 100 specifies, as the SC-MCCH monitoring unnecessary period, a period from the timing of receiving the notification information until the modification timing.

In an example illustrated in FIG. 14, the eNB 200 notifies the UE 100 of the notification information at a first timing (times t0 to t1) within the SC-MCCH modification period from times t0 to t6. The notification information includes the timing information indicating to modify the SC-MCCH information after the next SC-MCCH modification period has elapsed. As illustrated in FIG. 14(b), upon receiving the notification information at the timing of the times t0 to t1, the UE 100 specifies, as the SC-MCCH monitoring unnecessary period, a period from the timing (time t1) to an end timing (time t12) of the next SC-MCCH modification period, and omits monitoring the SC-MCCH in the SC-MCCH monitoring unnecessary period. This completely eliminates a need for the UE 100 to monitor the SC-MCCH within the SC-MCCH modification period from the time t6 to the time t12. The UE 100 monitors the SC-MCCH at a timing (times t12 to t13) when the SC-MCCH monitoring unnecessary period has elapsed.

The eNB 200 may notify the UE 100 of the notification information for each MBMS service (TMGI). In this case, the eNB 200 may notify the timing information for each TMGI in the notification information. The notification information includes a TMGI corresponding to a predetermined MBMS service and the timing information indicating a timing at which the SC-MCCH information corresponding to the predetermined MBMS service is modified next. The notification information may include a list of TMGIs and the timing information associated with each of the TMGIs. Upon receiving the notification information, the UE 100 obtains from the notification information the timing information corresponding to the MBMS service (TMGI) that the UE 100 is receiving or interested in receiving, and based on the obtained timing information, the UE 100 specifies the SC-MCCH monitoring unnecessary period.

In the operation pattern 1 of the first embodiment, a scenario in which a plurality of SC-MCCHs are provided in the same cell may be assumed. In this case, each of the SC-MCCHs may be associated with one or more MBMS services (TMGIs). The level of the enhanced coverage applied to each of the SC-MCCHs may be different. If there are SC-MCCHs corresponding to a plurality of TMGIs, the SC-MCCH modification period may be differed for each TMGI. As an example, in the SIB 20, the eNB 200 notifies the UE 100 of the SC-MCCH modification period associated with the TMGI. The SIB 20 may include the list of TMGIs and the SC-MCCH modification period associated with each TMGI. Upon receiving the SIB 20, the UE 100 obtains from the SIB 20 the SC-MCCH modification period corresponding to the MBMS service (TMGI) that the UE 100 is receiving or interested in receiving, and based on the obtained SC-MCCH modification period, the UE 100 specifies the SC-MCCH monitoring unnecessary period.

FIG. 15 is a diagram illustrating an operation pattern 2 of the first embodiment.

As illustrated in FIG. 15(b), the eNB 200 cyclically schedules the SC-MTCH. A scheduling cycle (Cycle) and a scheduling start offset (Start offset) of the SC-MTCH are set by schedulingPeriodStartOffsetSCPTM or parameter in the SC-MCCH, and are an integral multiple of the subframe. Normally, the UE 100 monitors the SC-MTCH during an On duration for each scheduling cycle (Cycle). The On duration is set by onDurationTimerSCPTM or parameter in the SC-MCCH, and is an integral multiple of the subframe. If the UE 100 detects that the PDCCH destined for the UE 100 schedules downlink transmission within the ON duration, the UE 100 maintains an ON state for a predetermined time period and continues monitoring the SC-MTCH. The predetermined time period is set by drx-InactivityTimerSCPTM or parameter in the SC-MCCH, and is an integral multiple of the subframe. In this way, the UE 100 discontinuously monitors the SC-MTCH according to the parameter in the SC-MCCH. Such an operation is referred to as "discontinuous reception (DRX)" for SC-PTM.

However, in such a method using the DRX, the UE 100 needs to monitor the SC-MTCH for each scheduling cycle (Cycle).

In the example illustrated in FIG. 15(*a*), the eNB 200 notifies the UE 100 of the notification information at an SC-MCCH transmission timing (times t0 to t1) via the SC-MCCH. The notification information includes timing information indicating to schedule the SC-MTCH after an elapse of a predetermined radio frame (SFN). The notification information may indicate the number of scheduling cycles (N cycles) in which the monitoring is to be omitted. The monitoring unnecessary period is a period up to a future timing when the MBMS data is scheduled. The monitoring unnecessary period according to the operation pattern 2 of the first embodiment is referred to as "SC-MTCH monitoring unnecessary period".

The eNB 200 (controller 230) includes the notification information into the SC-MCCH (SC-MCCH information). Alternatively, the eNB 200 (controller 230) may include the notification information into the BCCH (SIB 20). The timing information may be information directly indicating a scheduling timing of SC-MTCH information, or information relatively indicating the scheduling timing based on the current timing. Timing information may be specified in units of radio frame (SFN), units of hyper frame (H-SFN), units of subframe, or units of scheduling cycle.

As illustrated in FIG. 15(*c*), upon receiving the notification information at the timing of the times t0 to t1, the UE 100 specifies, as the SC-MCCH monitoring unnecessary period, a period from the timing (time t1) to the SC-MTCH scheduling timing (time t8), and omits monitoring the SC-MCCH in the SC-MCCH monitoring unnecessary period. This completely eliminates a need for the UE 100 to monitor the SC-MTCH from the time t1 to the time t8. The UE 100 monitors the SC-MTCH at the On duration (times t8 to t9) at a timing when the SC-MTCH monitoring unnecessary period has elapsed. Further, the UE 100 detects the PDCCH indicating the scheduling of the downlink transmission destined for the UE 100 during the ON duration (times t8 to t9), and continues monitoring the SC-MTCH until a time t10.

The eNB 200 may notify the UE 100 of the notification information for each MBMS service (TMGI). In this case, the eNB 200 may notify the timing information for each TMGI in the notification information. The notification information includes the TMGI corresponding to a predetermined MBMS service and the timing information indicating a timing at which the SC-MTCH corresponding to the predetermined MBMS service is scheduled next. The notification information may include a list of TMGIs and the timing information associated with each of the TMGIs. Upon receiving the notification information, the UE 100 obtains, from the notification information, the timing information corresponding to the MBMS service (TMGI) that the UE 100 is receiving or interested in receiving, and based on the obtained timing information, the UE 100 specifies the SC-MTCH monitoring unnecessary period.

In the operation pattern 2 of the first embodiment, the eNB 200 (controller 230) notifies the UE 100 of the notification information indicating the future timing at which the SC-MTCH (MBMS data) is scheduled. The future timing can be regarded as a scheduling start timing of the SC-MTCH (that is, a timing at which the UE 100 should start monitoring the SC-MTCH). Further, the eNB 200 (controller 230) may indicate the future timing at which the scheduling of the SC-MTCH (MBMS data) is ended, in the notification information. Such an end timing may be information directly indicating the scheduling end timing of the SC-MTCH, or information (period information) relatively indicating the scheduling end timing based on the scheduling start timing. Information on the scheduling end timing may be specified in units of radio frame (SFN), units of hyper frame (H-SFN), units of subframe unit, or units of scheduling cycle. The UE 100 specifies the period from the scheduling start timing to the scheduling end timing as an SC-MTCH monitoring necessary period.

Second Embodiment

A second embodiment will be described with a focus on a difference from the first embodiment. Similarly to the first embodiment, the second embodiment mainly assumes a case where the UE 100 in the RRC idle state receives the MBMS service delivered by the SC-PTM. The UE 100 may be the new category of a UE described above.

In the first embodiment, the example in which the SC-MCCH is scheduled in units of radio frame and the SC-MTCH is scheduled in units of subframe is described. In the second embodiment, the SC-MCCH/SC-MTCH is scheduled in units of hyper frame. The UE 100 can omit monitoring of the SC-MCCH/SC-MTCH in the hyper frame where the SC-MCCH/SC-MTCH is not scheduled.

FIG. 16 is a diagram illustrating a relationship between the hyper frame, the radio frame, and the sub frame. As illustrated in FIG. 16, one radio frame (Radio frame) is comprised of ten subframes (Subframes). The subframe is identified by subframe numbers from 0 to 9. One hyper frame (Hyper frame) is comprised of 1024 radio frames. The radio frame is identified by system frame numbers (SFNs) from 0 to 1023. The hyper frame is identified by hyper frame numbers (H-SFN: Hyper System Frame Numbers). Each cell broadcasts the current H-SFN.

The eNB 200 (transmitter 210) according to the second embodiment transmits the MBMS signal to the UE 100 via the SC-MCCH or the SC-MTCH. The MBMS signal includes at least one of MBMS control information (SC-PTM setting information) transmitted via the SC-MCCH and MBMS data transmitted via the SC-MTCH. The eNB 200 (controller 230) notifies the UE 100 of period information indicating a period in which the UE 100 should monitor the MBMS signal. This period is an SC-MTCH scheduling period in which the SC-MTCH is scheduled. Alternatively, the period is an SC-MCCH modification period in which a content of the MBMS control information transmitted via the SC-MCCH may be modified. The period has a time length equal to or longer than a hyper frame including a plurality of radio frames. The period may have a time length that is an integral multiple of the hyper frames. The period information is used by the UE 100 to determine a hyper frame number (H-SFN) for monitoring the MBMS signal.

The UE 100 (controller 130) according to the second embodiment discontinuously monitors the MBMS signal transmitted from the eNB 200 via the SC-MCCH or the SC-MTCH. The UE 100 (receiver 110) receives from the eNB 200 the period information indicating a period for monitoring the MBMS signal. Based on the period information, the UE 100 (controller 130) determines the hyper frame number (H-SFN) for monitoring the MBMS signal.

FIG. 17 is a flowchart illustrating an example of an operation flow of the UE 100 according to the second embodiment. As illustrated in FIG. 17, in step S21, the UE 100 (receiver 110) receives from the eNB 200 period information indicating a period for monitoring the MBMS signal. The period has a time length that is an integral multiple of the hyper frame. In step S22, the UE 100 (controller 130) determines a hyper frame number (H-SFN) for monitoring the MBMS signal, based on the period information. Based on the identifier (TMGI) of the MBMS service that the UE 100 is receiving or interested in receiving, and the period information, the UE 100 (controller 130) may determine a hyper frame number (H-SFN) for monitoring the MBMS signal. In step S23, the UE 100 (controller 130) determines a frame number (SFN) and/or a subframe number for monitoring the MBMS signal within the determined hyper frame number (H-SFN). The UE 100 (controller 130) may determine a hyper frame number and a frame number for monitoring the MBMS signal, based on the period information. The UE 100 (controller 130) may determine a frame number (SFN) for monitoring the SC-MCCH according to a parameter in the SIB 20. The UE 100 (controller 130) may determine a subframe number for monitoring the SC-MTCH according to a parameter in the SC-MCCH. In step S24, the UE 100 (controller 130) monitors (and receives) the MBMS signal in the determined radio frame number and/or subframe in the hyper frame.

FIG. 18 is a diagram illustrating an operation pattern 1 of the second embodiment. The operation pattern 1 of the second embodiment is a pattern for setting the SC-MTCH scheduling period (SC-MTCH scheduling period) in units of hyper frames.

As illustrated in FIG. 18, in step S201, the UE 100 receives the SC-MTCH scheduling period (M) from the eNB 200. The SC-MTCH scheduling period (M) may be included in the BCCH (SIB 20) or the SC-MCCH (SC-MCCH information). The SC-MTCH scheduling period (M) may be associated with the TMGI. The BCCH (SIB 20) or the SC-MCCH (SC-MCCH information) may include a list of TMGIs and the SC-MTCH scheduling period (M) associated with each of the TMGIs.

In step S202, the UE 100 determines whether or not "current H-SFN mod M=TMGI mod M" is satisfied. Here, the "current H-SFN" is a current H-SFN broadcast from the eNB 200. The "TMGI" is an identifier of the MBMS service that the UE 100 is receiving or interested in receiving. "M" is the scheduling cycle of the SC-MTCH belonging to the MBMS service that the UE 100 is receiving or interested in receiving, which is an integral multiple of the hyper frame.

If "NO" in step S202, in step S203, the UE 100 determines that the SC-MTCH is not scheduled in the current H-SFN and does not monitor the SC-MTCH (that is, sleeps).

On the other hand, if "YES" in step S202, in step S204, the UE 100 monitors the SC-MTCH in the current H-SFN. The UE 100 (controller 130) may determine the frame number (SFN) and/or the subframe number for monitoring the SC-MTCH according to a parameter in the SC-MCCH.

Figure 19:
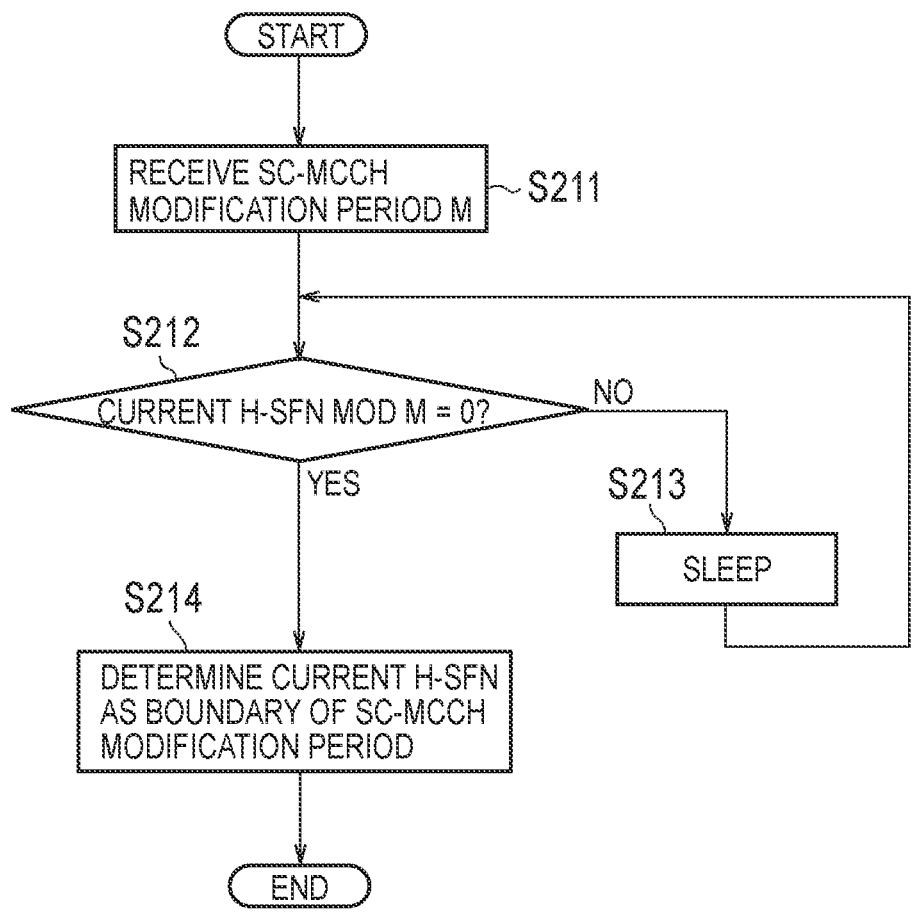
FIG. 19 is a flowchart illustrating an operation pattern 2 of the second embodiment.

FIG. 19 is a diagram illustrating an operation pattern 2 of the second embodiment. The operation pattern 2 of the second embodiment is a pattern for setting the SC-MCCH modification period in units of hyper frames.

As illustrated in FIG. 19, in step S211, the UE 100 receives the SC-MCCH modification period (M) from the eNB 200. The SC-MCCH modification period (M) may be included in the BCCH (SIB 20) or the SC-MCCH (SC-MCCH information). The SC-MCCH modification period (M) may be associated with the TMGI. The BCCH (SIB 20) or the SC-MCCH (SC-MCCH information) may include a list of TMGIs and the SC-MCCH modification period (M) associated with each of the TMGIs. If the UE 100 is notified of the SC-MCCH modification period (M), the UE 100 may ignore a conventional sc-mcch-ModificationPeriod in the BCCH (SIB 20) (that is, the SC-MCCH modification period in units of radio frame).

In step S212, the UE 100 determines whether or not "current H-SFN mod M=0" is satisfied. Here, the "current H-SFN" is a current H-SFN broadcast from the eNB 200. "M" is the scheduling cycle of the SC-MCCH, and is an integral multiple of the hyper frame. "M" may be a scheduling cycle of the SC-MCCH belonging to the MBMS service that the UE 100 is receiving or interested in receiving.

If "NO" in step S212, the UE 100 determines in step S213 that the current H-SFN is not the boundary of the SC-MCCH modification period and does not need to monitor the SC-MCCH (that is, sleeps).

On the other hand, if "YES" in step S212, the UE 100 determines in step S214 that the current H-SFN is the boundary of the SC-MCCH modification period and monitors the SC-MCCH. The UE 100 (controller 130) may determine the SFN defined by "SFN mod (TMGI mod 1024)" in the current H-SFN as the boundary of the SC-MCCH modification period. Here, the "TMGI" is an identifier of the MBMS service that the UE 100 is receiving or interested in receiving. The UE 100 (controller 130) may determine the frame number (SFN) and/or the subframe number for monitoring the SC-MCCH according to the parameter in the BCCH (SIB 20).

Figure 20:
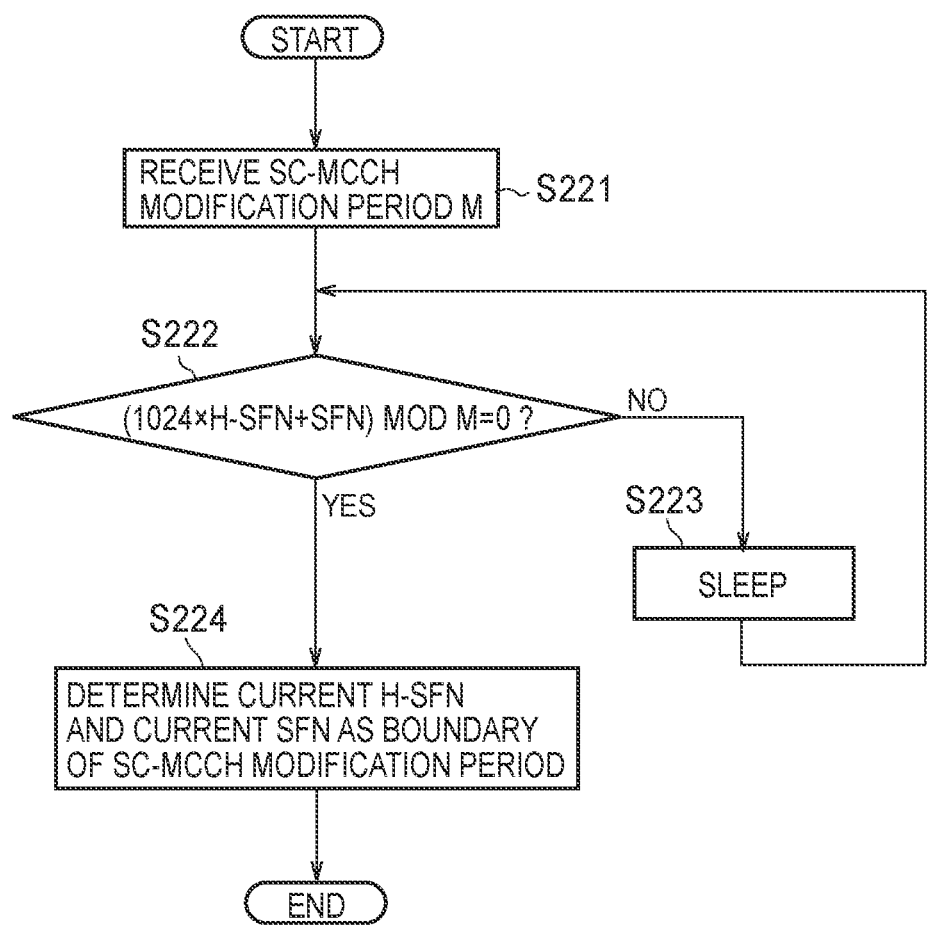
FIG. 20 is a flowchart illustrating an operation pattern 3 of the second embodiment.

FIG. 20 is a flowchart illustrating an operation pattern 3 of the second embodiment. The operation pattern 3 of the second embodiment is a pattern obtained by partially modifying the operation pattern 2 of the second embodiment.

As illustrated in FIG. 20, in step S221, the UE 100 receives the SC-MCCH modification period (M) from the eNB 200. The SC-MCCH modification period (M) may be included in the BCCH (SIB 20) or the SC-MCCH (SC-MCCH information). The SC-MCCH modification period (M) may be associated with the TMGI. The BCCH (SIB 20) or the SC-MCCH (SC-MCCH information) may include a list of TMGIs and the SC-MCCH modification period (M) associated with each of the TMGIs.

In step S222, the UE 100 determines whether or not "(1024×current H-SFN+current SFN) mod M=0" is satisfied. Here, "M" is the scheduling cycle of the SC-MCCH, which is an integral multiple of the radio frame, but a value of 1024 or more (that is, a time period of one hyper frame or more) may be set. "M" may be a scheduling cycle of the SC-MCCH belonging to the MBMS service that the UE 100 is receiving or interested in receiving.

Alternatively, in step S222, the UE 100 may determine whether or not "(1024×current H-SFN+current SFN) mod M=TMGI mod M" is satisfied instead of "(1024×current H-SFN+current SFN) mod M=0". The "TMGI" is an identifier of the MBMS service that the UE 100 is receiving or interested in receiving.

If "NO" in step S222, the UE 100 determines in step S223 that the current H-SFN and the current SFN are not the boundary of the SC-MCCH modification period and does not need to monitor the SC-MCCH (that is, sleeps).

On the other hand, if "YES" in step S222, the UE 100 determines in step S224 that the current H-SFN and the current SFN are the boundary of the SC-MCCH modification period and monitors the SC-MCCH.

Third Embodiment

A third embodiment will be described with a focus on a difference from the first and second embodiments. Similarly to the first and second embodiments, the third embodiment assumes a case where the UE 100 in the RRC idle state receives the MBMS service delivered by the SC-PTM. The UE 100 may be the new category of a UE described above.

In the RRC idle state, the UE 100 (receiver 110) according to the third embodiment receives the MBMS data from the eNB 200 via the SC-MTCH. During reception of the MBMS data, the UE 100 (controller 130) transitions from the RRC idle state to the RRC connected state in response to occurrence of an event forcing the UE 100 to transition to the RRC connected state. After transitioning to the RRC connected state, the UE 100 (transmitter 120) transmits the identifier (TMGI) of the MBMS service corresponding to the MBMS data that was being received by the UE 100 in the RRC idle state, to the eNB 200.

Figure 21:
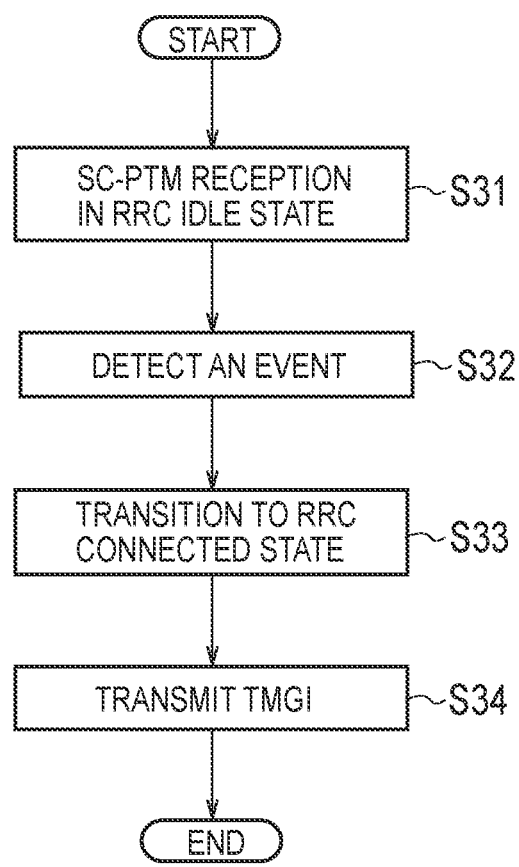
FIG. 21 is a flowchart illustrating an example of an operation flow of a UE according to a third embodiment.

FIG. 21 is a flowchart illustrating an example of an operation flow of the UE 100 according to the third embodiment. As illustrated in FIG. 21, in step S31, the UE 100 (receiver 110), in the RRC idle state, receives the MBMS data from the eNB 200 via the SC-MTCH. In step S32, during reception of the MBMS data, the UE 100 (controller 130) detects an event forcing the UE 100 to transition to the RRC connected state. Such an event may be an event that a paging is received, or an event that a necessity to transmit signaling has occurred. In step S33, the UE 100 (controller 130) transitions from the RRC idle state to the RRC connected state. In step S34, the UE 100 (transmitter 120) transmits the identifier (TMGI) of the MBMS service corresponding to the MBMS data that was being received by the UE 100 in the RRC idle state, to the eNB 200.

In the third embodiment, if an event related to the unicast occurs during SC-PTM reception, the UE 100 may ensure that an operation related to the unicast is preferentially performed. For example, when data to be transmitted by unicast is generated, the UE 100 prioritizes transmission of the data and may interrupt an SC-PTM reception operation (for example, if simultaneous processing is impossible) where necessary.

Figure 22:
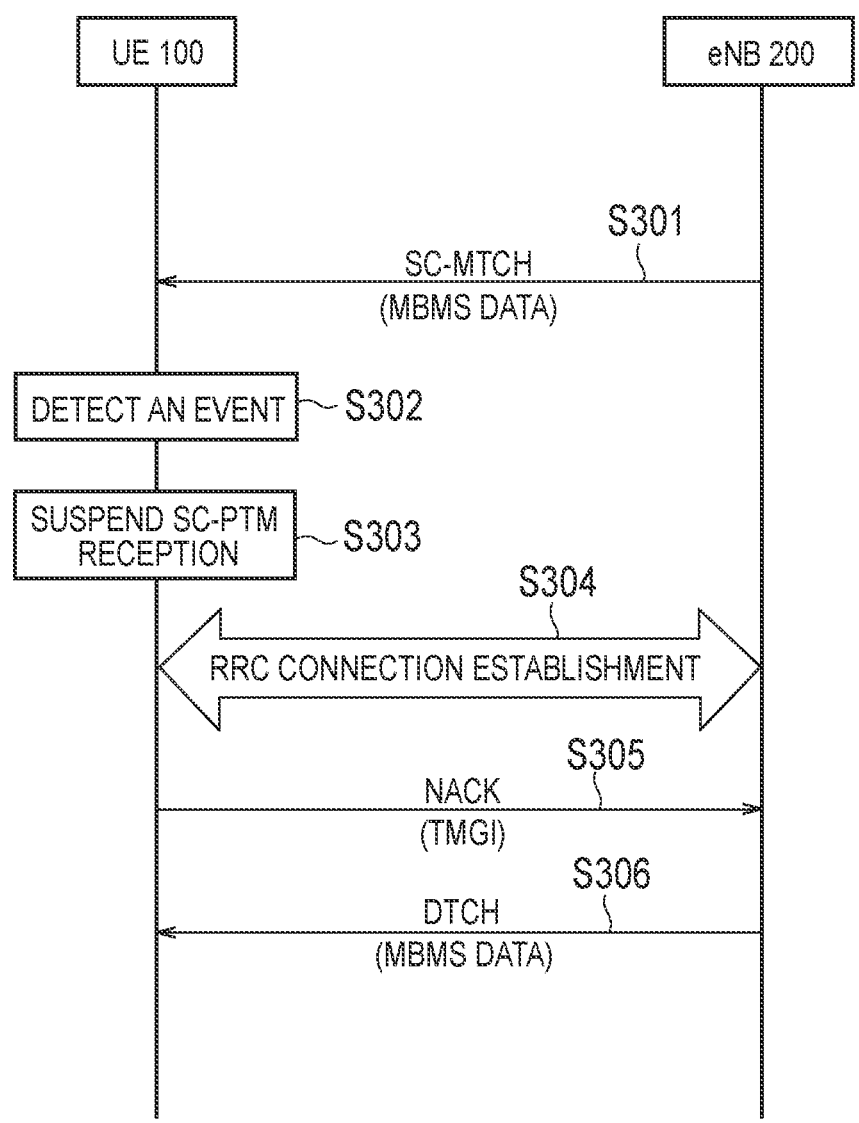
FIG. 22 is a flowchart illustrating an operation pattern 1 of the third embodiment.

FIG. 22 is a flowchart illustrating an operation pattern 1 of the third embodiment. In the operation pattern 1 of the third embodiment, the UE 100 (transmitter 120) transmits a request signal requesting unicast retransmission of the MBMS data to the eNB 200. The request signal includes the identifier (TMGI) of the MBMS service corresponding to the MBMS data that was being received by the UE 100 in the RRC idle state. In the RRC connected state, the UE 100 (receiver 110) receives the MBMS data transmitted by unicast from the eNB 200.

As illustrated in FIG. 22, in step S301, the eNB 200 transmits the MBMS data via the SC-MTCH. The MBMS data is data belonging to a predetermined MBMS service. The UE 100 receives, in the RRC idle state, the MBMS data via the SC-MTCH. The eNB 200 accumulates the MBMS data, which is associated with the TMGI, transmitted via the SC-MTCH in a buffer of the eNB 200. Further, the eNB 200 may associate the accumulated MBMS data with a data identifier such as an HARQ process ID, and an RLC sequence number.

In step S302, the UE 100 detects an event forcing the UE 100 to transition to the RRC connected state. In step S303, the UE 100 suspends the SC-PTM reception in response to the detection of the event. In step S304, the UE 100 establishes an RRC connection with the eNB 200 by transmitting an RRC connection request message to the eNB 200, and transitions to the RRC connected state.

In step S305, the UE 100 in the RRC connected state transmits to the eNB 200 a NACK (retransmission request) for requesting the retransmission of the MBMS data not received due to the suspension of the SC-PTM reception. The NACK may be transmitted by the RRC message, RLC Control PDU (Protocol Data Unit), or MAC CE (Control Element). The NACK includes the identifier (TMGI) of the MBMS service corresponding to the MBMS data that was being received by the UE 100 in the RRC idle state. The NACK may include an identifier (such as an HARQ process ID, and an RLC sequence number) of the data received last or not unreceived.

Based on the NACK, the eNB 200 specifies the MBMS data for which the UE 100 requests the retransmission. The eNB 200 reads the MBMS data from the buffer of the eNB 200. In step S306, the eNB 200 transmits the MBMS data read from the buffer to the UE 100 via the DTCH. The DTCH is a logical channel for unicast transmission. Thereafter, in the RRC connected state, the UE 100 receives the MBMS data by unicast.

Figure 23:
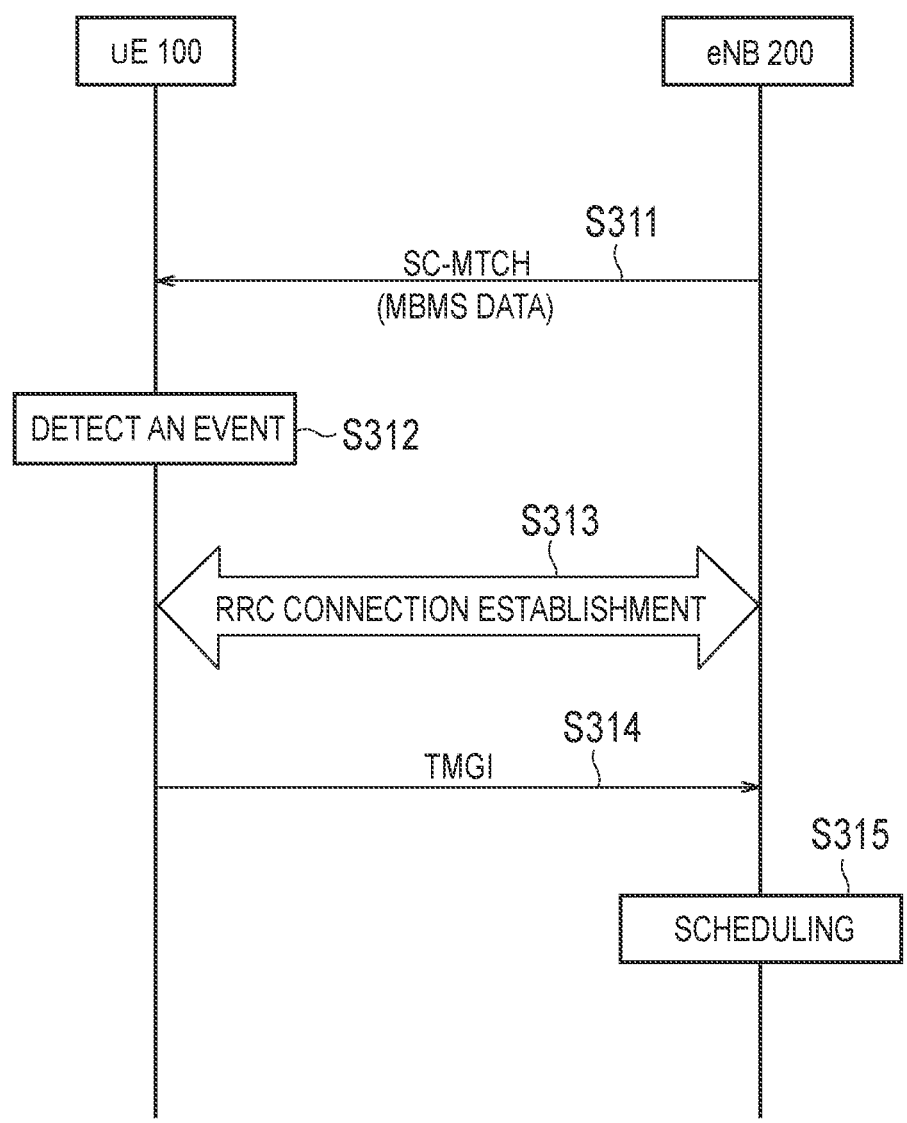
FIG. 23 is a flowchart illustrating an operation pattern 2 of the third embodiment.

FIG. 23 is a flowchart illustrating an operation pattern 2 of the third embodiment. In the operation pattern 2 of the third embodiment, the UE 100 (receiver 110) continues to receive the MBMS data from the eNB 200 via the SC-MTCH even if the UE 100 (receiver 110) transitions to the RRC connected state.

As illustrated in FIG. 23, in step S311, the eNB 200 transmits the MBMS data via the SC-MTCH. The MBMS data is data belonging to a predetermined MBMS service. The UE 100 receives, in the RRC idle state, the MBMS data via the SC-MTCH.

In step S312, the UE 100 detects an event forcing the UE 100 to transition to the RRC connected state. In the operation pattern 2, the UE 100 may continue, rather than suspend, the SC-PTM reception even if the UE 100 detects the event. In step S313, the UE 100 establishes an RRC connection with the eNB 200 by transmitting an RRC connection request message to the eNB 200, and transitions to the RRC connected state.

In step S314, the UE 100 in the RRC connected state notifies the eNB 200 of the TMGI of the SC-PTM that is being received. The UE 100 may include the TMGI into an MBMS Interest Indication being one of the RRC messages. The MBMS interest notification is a message indicating that the UE 100 is receiving or interested in receiving the MBMS. When a flag indicating that the UE is actually receiving the MBMS is included into the MBMS interest notification, the UE 100 may indicate that the UE 100 is not in a state of simply being interested in receiving the MBMS (state of not receiving the MBMS yet). Alternatively, the UE 100 may include the TMGI into RLC Control PDU, MAC CE, or the like.

In addition, the UE 100 may notify the eNB 200 of an attribute (delivery method) of the MBMS service that is being received. Example of the attribute (delivery method) of the MBMS service include download (download delivery method), streaming (streaming delivery method), group communication delivery method, and the like.

In step S315, the eNB 200 performs scheduling so that the UE 100 can appropriately receive the SC-PTM transmission (multicast) and the unicast transmission to the UE 100, based on a notification from the UE 100 (and a capability of the UE 100 and the like). As an example, the eNB 200 does not schedule the SC-PTM transmission and the unicast transmission to the UE 100 in the same subframe. Alternatively, the eNB 200 schedules the SC-PTM transmission and the unicast transmission to the UE 100 in an adjacent RB (Resource Block) or the same NB (Narrow Band). Further, the eNB 200 may preferentially schedule the SC-PTM transmission over the unicast transmission to the UE 100, in one subframe. Since the SC-PTM transmission is addressed to a plurality of UEs, it is preferable to prioritize the SC-PTM when considering an influence on the other UEs. When the SC-PTM transmission is prioritized, the eNB 200 may temporarily buffer data for unicast.

Other Embodiments

A network (base station or the like) can again transmit the same data as the already multicast-transmitted data during an MBMS session (or during a file delivery session). Such retransmission data contributes to enhancing a reliability of data delivery; however, the UE that has already received the data may possibly receive unnecessary overlapping data and control information associated therewith. Therefore, in the next modification period, the base station makes a notification to the UE when the data retransmission is performed. The UE that receives the notification and has already received the data may not need to obtain the data (and the relevant control information).

The above-described embodiments give no discussion as to a case where the UE receives a modification notification of SC-MCCH by paging (or DCI masked with P-RNTI). In this case, it is assumed that DRX (discontinuous paging monitor) is further set to the UE. If there are a plurality of SC-MCCH modification periods within the DRX cycle, the UE is required to monitor the SC-MCCH modification notification more times than an actual paging monitoring count, and thus, there is a concern that the power consumption increases. In such a case, the UE is exempted from a reception operation for each SC-MCCH modification period. For example, the SC-MCCH modification period (boundary) where the reception is exempted may be specified by using information for specifying the monitoring unnecessary period described above. Alternatively, the network (base station) may continue to transmit the notification in a certain predetermined period.

Each of the above-described embodiments may be implemented independently; two or more embodiments may be combined and implemented. For example, a part of the process according to one embodiment may be added to another embodiment. Alternatively, a part of the process according to one embodiment may be replaced by a part of a configuration of another embodiment.

In the above-described embodiments, the MBMS scenario using the SC-PTM is mainly assumed, but an MBMS scenario using the MBSFN may be assumed. As an example, in the above-described embodiments, the SC-PTM may be replaced by the MBSFN, the SC-MCCH may be replaced by the MCCH, and the SC-MTCH may be replaced by the MTCH.

In the above-described embodiments, a delivery of firmware is assumed as the MBMS service. However, an MBMS service such as a group message delivery, a group chat message delivery, a delivery of a virus definition file, a scheduled update file delivery such as a weather forecast, an unscheduled file delivery such as a news bulletin, a nighttime file delivery (off peak delivery) such as a video content, an audio/video streaming delivery, a telephone/video phone (group communication), a live video delivery, and a radio audio delivery may be assumed.

In the above-described embodiment, the LTE system is exemplified as the mobile communication system. However, the present invention is not limited to the LTE system. The present invention may be applied to the mobile communication system other than the LTE system.

Supplementary Note 1

1. Introduction

In this supplementary note, the details of SC-MCCH modification/repetition periods, RAN-level start/stop time information and some other aspects are discussed.

2. Discussion (2.1. SC-MCCH Modification Period)

According to the current specification, the SC-MCCH modification boundary is defined by "SFN values for which SFN mod m=0, where m is the number of radio frames comprising the modification period", and the modification period is provided in SIB20 (see FIG. 24).

On the other hand, SFN is depicted with 10 bits, i.e., the upper bound is 1024. So, some of the existing values defined in sc-mcch-ModificationPeriod would not actually work, i.e., rf2048 (20.48 [s])~rf65536 (10.92 [min]).

Observation 1: The current definition of SC-MCCH modification boundary is limited within 10.24 seconds due to SFN upper bound, while SC-MCCH modification period is defined up to 10.92 minutes (as "spare").

The current restriction may be removed with the same way as in Rel-13 for the extension of SI modification boundary with H-SFN, i.e., "the modification period boundaries are defined by SFN values for which (H-SFN*1024+SFN) mod m=0". So, at least for full use of the existing values, the SC-MCCH modification boundary should be enhanced.

Proposal 1: The SC-MCCH modification boundary should be defined by "(H-SFN*1024+SFN) mod m=0" if H-SFN is provided in SIB1-BR or MIB-NB/SIB-NB, same as in Rel-13 BCCH modification boundary for eMTC/NB-IoT.

If Proposal 1 is agreeable, it should be considered how to ensure the backward compatibility, especially in case where the same SC-MCCH is used for FeMTC UE and Rel-13 SC-PTM UE. As discussed in Observation 1, there is no modification boundary available if Rel-13 UE is configured with the value larger than rf1024. However, the use case of critical communication was assumed (but not limited) in Rel-13 SC-PTM, which is quite different use case in Rel-14 FeMTC. So, RAN2 should discuss whether the backward compatibility is necessary in terms of SC-MCCH modification period configuration. If it's needed, there would be some simple solutions, e.g., to define the new IE for Rel-14 SC-MCCH modification period, to allow multiple SC-MCCHs for Rel-13/14 separation and so on.

Proposal 2: If Proposal 1 is agreeable, RAN2 should further discuss whether and how to ensure backward compatibility of the SC-MCCH modification period configuration.

Figure 25:
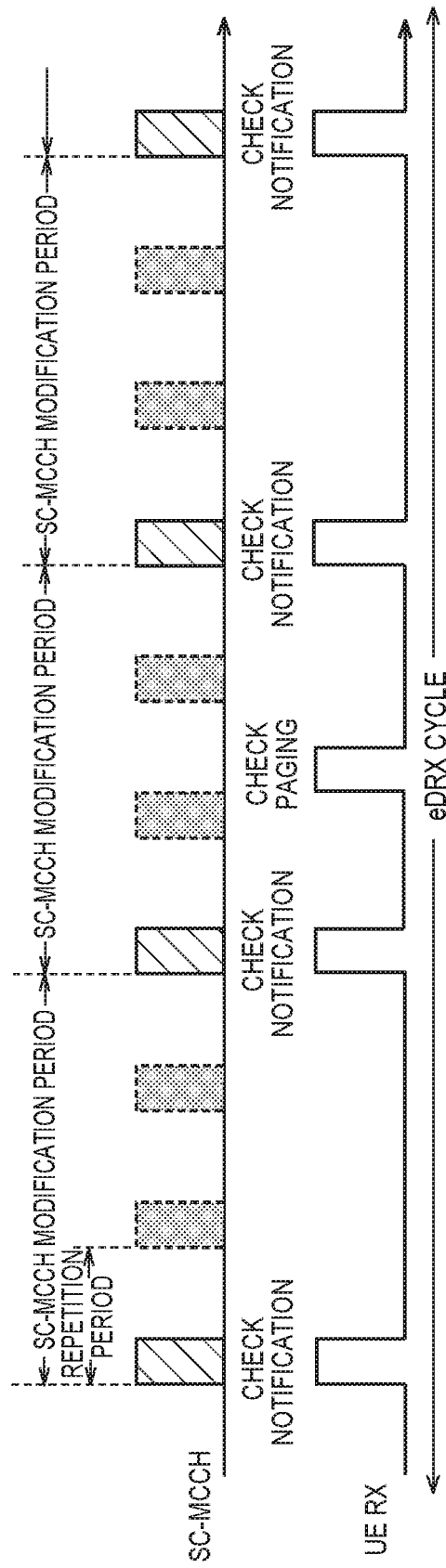
FIG. 25 is a diagram according to the supplementary note.

It's also worth discussing whether the existing upper bound of SC-MCCH modification period, i.e., rf65536 (10.92 [min]), is sufficient. It may cause more power consumption in UE with the current periods. For example, the UE interested in SC-PTM reception needs to wake up in a SC-MCCH modification period to check whether SC-MCCH change notification is available, i.e., to monitor PDCCH scrambled with SC-N-RNTI transmitted within SC-MCCH occasion in Rel-13. If it could be assumed that MTC UEs and NB-IoT UEs are likely configured with eDRX (43.69 [min] and 2.91 [H] at the maximum respectively), the current upper bound of SC-MCCH modification period may significantly increase UE power consumption, in addition to the regular paging monitoring (see FIG. 25: SC-MCCH change notification check during eDRX). So, the SC-MCCH modification boundary should be extended with 43.69 [min] and 2.91 [H].

Proposal 3: The SC-MCCH modification period should be extended up to 43.69 minutes and 2.91 hours, to align with the upper bound of eDRX.

(2.2. SC-MCCH Repetition Period)

The extension of SC-MCCH repetition period was concluded as a working assumption. The values and range are currently defined as FIG. 26.

The repetition period defined in Rel-13 was intended to fulfil the access latency requirement. However, the one of main use cases in Rel-14 multicast is the firmware update, i.e., considered as delay tolerant. In Rel-13, one of the main motivations for having repetitions was to allow UEs to participate in an on-going session in case they join late. However, this was mainly for streaming delivery e.g., MCPTT; while for this WI the main use case is for firmware download transmission, so the repetition period may be extended with little impact for the intended use case. Also, if it's necessary to prevent missed packets, we assume that the network could ensure that SC-MTCH may start to transmit after the corresponding SC-MCCH transmission is completed, e.g., after the next modification boundary. So, at least it could be extended with Rel-13 upper bound of SC-MCCH modification boundary, i.e., 10.24 [sec] or rf1024, which improves the resource efficiency and power saving from the NW's perspective. The benefit could be maximized when no repetition is configured, i.e., with the period equal to SC-MCCH modification boundary.

In addition, if Proposal 3 is agreeable, it's beneficial to further extend the repetition period up to rf65536 (10.92 [min]), rf262144 (43.69 [min]) or rf1048576 (2.91 [H]).

Proposal 4: The SC-MCCH repetition period should be extended to align with the upper bound of SC-MCCH modification period, as optimization for the delay tolerant use cases.

Figure 27:
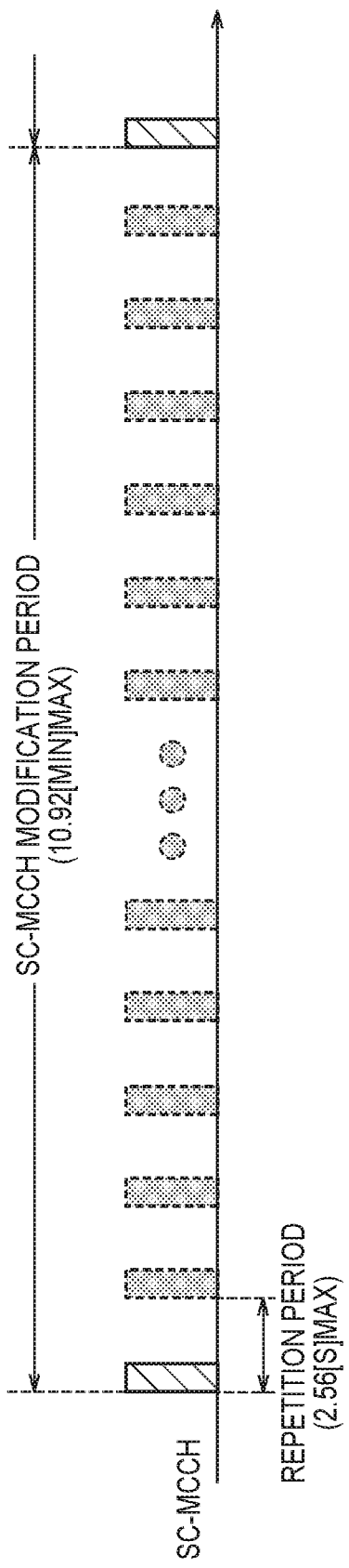
FIG. 27 is a diagram according to the supplementary note.

In FIG. 27, SC-MCCH repetition period (other than PDSCH repetition for CE) is illustrated.

(2.3. RAN-Level Start/Stop Time Information)

The RAN-level start/stop time information in addition to the current information, i.e., by USD, which assumes some use cases considering the scheduling of firmware delivery is the eNB's responsibility in AS layer. For example, the eNB may want to transmit different firmware files with different TMGI in TDD manner, if some of UEs are interested in both TMGIs. In this case, the exact start/stop time is different between the two files, and it's useful for the UE to know when the firmware of interest starts/stops to be delivered, in order to save its battery consumption.

The existing MBSFN has the measure to provide RAN-level stop time information with MAC CE, i.e., MCH Scheduling Information MAC Control Element, in order to provide the dynamic scheduling information for UE power saving. At that time, the reason why to introduce only the "stop" information was the "start" could be derived from the "stop" information. However, it's only applicable to MCH (i.e., MBSFN).

Figure 28:
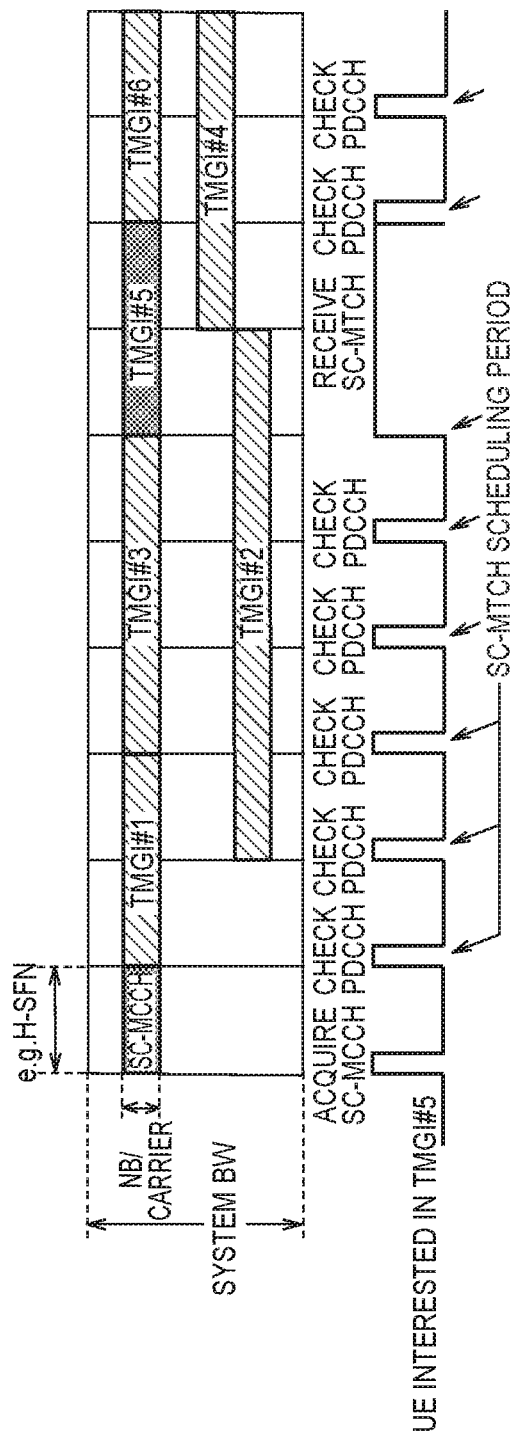
FIG. 28 is a diagram according to the supplementary note.

For SC-PTM in Rel-14, it's already considered as a working assumption that the SC-MTCH uses dynamic scheduling, i.e., with M/NPDCCH, this is under the agreements that RAN2 assumes that the legacy SC-MTCH mechanism in which the SC-MTCH is scheduled by PDCCH is reused for multi-cast in NB-IoT and MTC to achieve flexible scheduling and SC-MCCH for feMTC and NB-IoT is scheduled dynamically. In addition, it was agreed that Both SC-MCCH and SC-MTCH can maybe be scheduled on anchor carrier and/or non-anchor carrier for NB-IoT and SC-MCCH and SC-MTCH can maybe be scheduled on different carriers for NB-IoT and for MTC (narrowband for MTC). These characteristics of SC-PTM are fairly different from MBSFN which is transmitted only with the system bandwidth. So, it's unpredictable from the UE's perspective when the SC-MTCH serving the TMGI of interest will be delivered and it will consume more UE battery due to wake-up in each SC-MTCH scheduling period, as depicted in FIG. 28: Unnecessary wake-up (of UE interested in TMGI#5 for example). Therefore, it's useful to introduce the start/stop time information for efficient multicasting.

Note: As another use of the start/stop time information, it could be applicable to prevent unnecessary wake-up for SC-MCCH monitoring (in addition to/instead of SC-MTCH monitoring).

Proposal 5: The RAN-level start/stop information should be provided to conserve power at the UE.

If Proposal 5 is agreeable, the issue is which signalling carries the information, i.e., MAC CE or RRC message. Regarding the "stop", it's beneficial to use MAC CE since the UE interested in the "stop" is receiving the corresponding SC-MTCH. However, the "start" is not the case since it should be provided in advance of the actual start of corresponding SC-MTCH. So, the "start" should be provided in RRC massage, e.g., SC-MCCH.

Proposal 6: If Proposal 5 is agreeable, RAN2 should consider if the "start" information is provided by RRC message and the "stop" information is provided by MAC CE.

(2.4. Others)

(2.4.1. SC-MCCH Change Notification)

RAN2 assumes that direct Indication or similar mechanism (that provides information in DCI) can be used for SC-MCCH change notification. RAN2 also had a working assumption that "MT (paging) vs. SC-PTM: MT (Paging) has higher priority than SC-PTM". So, the paging occasion is a good opportunity for any notifications, which is consistent with Rel-13 Direct Indication. In addition, it could coordinate both occasions for the paging monitor and the notification check, which is battery friendly from the UE point of view. So, the RNTI for SC-MCCH change notification should be P-RNTI.

Proposal 7: P-RNTI should be used for SC-MCCH change notification.

It's the simplest way to fully reuse the existing Direct Indication with allocate "SC-MCCH change notification" within the reserved bit in the 8 bits, i.e., Table 6.6-1 and Table 6.7.5-1 in TS 36.331, if just one notification is sufficient for SC-MCCH change. On the other hand, the TMGI specific change notification using DCI for SC-MTCH scheduling was proposed. It indeed allows more scheduling flexibility (between SC-MCCH and SC-MTCH) and avoids UE's unnecessary acquisition of SC-MCCH out of interest, if the content of SC-MCCH is assumed to change frequently.

Observation 2: TMGI-specific SC-MCCH change notification will be beneficial, if SC-MCCH is assumed to change frequently.

(2.4.2. Multiple SC-MCCHs)

In RAN2#95bis, it was FFS if there can be multiple SC-MCCH. At the same time, it was agreed that Different multicast services may have different coverage enhancement levels, which should be configurable depending on the need for a particular coverage enhancement for that service. From the current SC-MCCH point of view, all the configurations for different services need to be included in one SC-MCCH; thus, the SC-MCCH has to cover the deepest Enhanced Coverage, i.e., to be transmitted with the largest number of repetition among the services.

As discussed in sections 2.1 and 2.2, the different service may require different latency, i.e., different SC-MCCH modification periods and different SC-MCCH repetition periods. Additionally, it may be useful to separate SC-MCCH (i.e., into different SC-MCCHs) for Rel-13/14 UEs in case the configuration with non-backward compatible SC-MCCH modification period is not problematic, e.g., rf65536. RAN1#86bis concluded the following agreements.
Agreement:
  The maximum number of on-going SC-MTCHs supported by SC-MCCH is reduced compared to LTE.
  Send LS to RAN2 to
  Inform RAN2 that RAN1 assumes the maximum number of on-going SC-MTCHs supported by SC-MCCH is reduced compared to LTE
  Request RAN2 to inform RAN1 of the maximum number of on-going SC-MTCHs supported by SC-MCCH in FeMTC.
  Request RAN2 to inform RAN1 whether and how segmentation of SC-MCCH will be supported in Rel-14.
Agreements:
  The maximum number of on-going SC-MTCHs supported by SC-MCCH is reduced compared to LTE.
  Send LS to RAN2 to
  Inform RAN2 that RAN1 assumes the maximum number of on-going SC-MTCHs supported by SC-MCCH is reduced compared to LTE
  Request RAN2 to inform RAN1 of the maximum number of on-going SC-MTCHs supported by SC-MCCH in NB-IoT.
  Also include the larger maximum TBS value (if agreed this week)
  Request RAN2 to inform RAN1 whether and how segmentation of SC-MCCH will be supported in Rel-14.

Based on the LS above, currently RAN1 assumes the number of services, i.e., SC-MTCHs which could be configured in SC-MCCH should be reduced compared to LTE, but they did not exclude the possibility that more than one SC-MCCH can be supported per cell. If it's necessary to support many services simultaneously, then the principle of one SC-MCCH per cell may not be sufficient.

Considering above observations, it's fine to us to have multiple SC-MCCHs for future proofing.

Observation 3: RAN2 should take into account that SC-MCCH needs to cover not only different "CE levels" but also different latency requirements as well as number of services.

(2.4.3. Carrier Information (Confirmation)

In the last meeting, RAN2 agreed that SIB20 indicate the carrier for SC-MCCH, and SC-MCCH indicate the carrier for MTCH. The statement seems to refer only apply to eNB-IoT, while the intention was likely for FeMTC also. So, just for confirmation, RAN2 is asked to discuss whether it's also agreed that "SIB20 indicates the NB for SC-MCCH, and SC-MCCH indicates the NB for SC-MTCH".

Proposal 8: It's confirmed that SIB20 indicates the narrowband for SC-MCCH, and SC-MCCH indicates the narrowband for SC-MTCH.

Supplementary Note 2

In this supplementary note, the details of SC-PTM service continuity for FeMTC/eNB-IoT are discussed.

2. Discussion (2.1. Rel-13 Mechanism)

Figure 29:
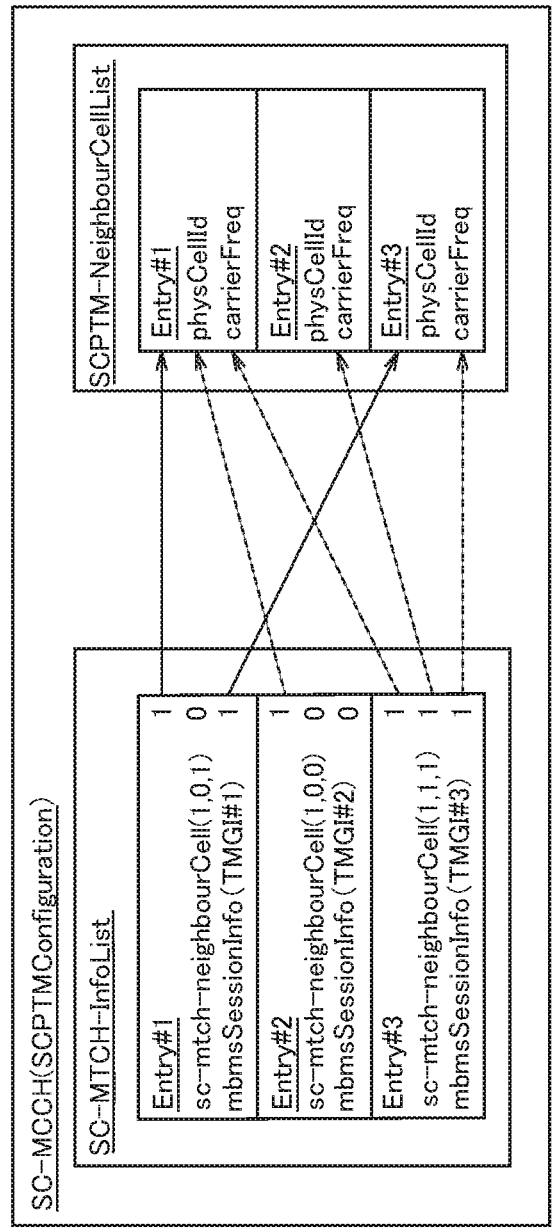
FIG. 29 is a diagram according to the supplementary note.

In Rel-13, the SC-MCCH provides the information for service continuity, in order for the UE to easily find the MBMS service(s) of interest served on the other frequency/cell. In detail, SCPTM-NeighbourCellList contains cell ID and frequency and sc-mtch-neighbourCell per TMGI indicates within its bit string whether each entry of the list provides the MBMS service or not (see FIG. 29).

On the other hand, SIB15 provides similar information but it was mainly intended for MBSFN. In detail, MBMS-SAI-List containing MBMS Service Area ID is provided for intra-frequency and also provided together with dl-Carrier-Freq for inter-frequency.

Compared to SIB15, SC-MCCH added the cell ID into service continuity information because of granularity change, i.e., from multi-cell broadcast (or single-frequency network) to single-cell PTM. So, the exact information of which resource provides the MBMS service of interest was already identified in Rel-13 as useful for service continuity (and also for UE battery consumption upon cell reselection).

Observation 1: For service continuity of SC-PTM, Rel-13 included the cell IDs in SC-MCCH where MBMS service(s) are provided, due to the change from single-frequency to single-cell multicast.

(2.2. Rel-14 Service Continuity Enhancements)

It has been not decided yet whether to enhance service continuity information. As in Observation 1, it's first necessary to look at whether the granularity of resource is changed in Rel-14. It's quite obvious to support the multicast on different assumption of radio resource from the previous release since RAN2 aims to "Introduction of necessary enhancements to support narrowband operation, e.g. support of MPDCCH, and coverage enhancement, e.g. repetitions". Also, the different use case is stated in the WID that "e.g. firmware or software updates, group message delivery". The changes are identified as follows.

Operation: Wideband in Rel-13 to Narrowband in Rel-14;
Coverage: Normal coverage in Rel-13 to Enhanced coverage in Rel-14;
Use case (but not limited to): MCPTT in Rel-13 to Firmware/software update and Group message delivery in Rel-14.

Observation 2: The assumptions/objectives of multicast are changed in Rel-14.

Therefore, RAN2 should discuss whether the service continuity needs to be enhanced for each change.

(2.2.1. Narrowband Operation)

As mentioned in Observation 1, it's useful to extend the service continuity information when the resource granularity is changed, which is also applicable to the narrowband multicast in Rel-14. It could be considered that there are two options as follows.

Option 1: Indicate whether the MBMS service is provided in a narrowband/carrier.

This is simple extension to indicate whether the SC-MTCH is receivable by BL UE/NB-IoT UE. For example, it may be implemented in SC-MTCH-InfoList as FIG. 30. However, sc-mtch-neighbourCell-BL indicates whether the SC-MTCH is provided within a narrowband (i.e., 6 PRBs), and sc-mtch-neighbourCell-NB indicates whether the SC-MTCH is provided within a carrier (i.e., 1 PRB).

Option 2: Indicate which narrowband/carrier the MBMS service is provided in.

It may be also useful that the SC-MCCH provides the information e.g., where the MBMS service is provided on the neighbour cell, as similar to RAN2's agreement that "SIB20 indicate the carrier for SC-MCCH, and SC-MCCH indicate the carrier for MTCH". However, it may be difficult for the eNB to provide similar information under FeMTC, i.e., which Narrowband the MBMS service is provided, since it may be assumed to be somewhat dynamically configurable within a system bandwidth. For example, it may be implemented in SCPTM-NeighbourCellList [3] as FIG. 31. However, NarrowbandOperation indicates whether SC-PTM is provided within a narrowband (i.e., 6 PRBs), and carrierFreqOffset indicates where the anchor carrier (i.e., 1 PRB) providing SC-PTM is, as it is today in CarrierFreq-NB.

For FeMTC UEs, these options are quite similar but there is some difference regarding eNB-IoT UEs. With Option 1, the UE needs to search which carrier provides SC-PTM on neighbour cells, while Option 2 facilitates more smooth mobility. However, if it's the case that multiple anchor carriers broadcast multiple (different) SIB20s, Option 2 may need multiple IEs, e.g., a list, which causes additional overhead.

Both options have pros and cons. However, it's obvious that some sort of information on narrowband/carrier operation is necessary, as the enhancements in Rel-14 multicast for FeMTC/eNB-IoT.

Proposal 1: RAN2 should discuss if the narrowband operation of SC-PTM in the neighbour cells should be provided.

(2.2.2. Enhanced Coverage)

The other enhancement in Rel-14 is to support multicast in Enhanced Coverage, which is facilitated by e.g., repetition, power boosting and MCS selection. Although it's still "FFS if we have CE levels definition for SC-PTM", it was agreed that "UE need to know whether to attempt to receive a SC-PTM transmission or not, based on the UE radio conditions vs. the expected coverage of the SC-PTM transmission. FFS if the UE can do this based on knowing MCS and repetitions". If the "coverage boost level (i.e., some threshold or "offset" to normal coverage for SC-PTM reception reliability check)" is assumed to be provided by the serving cells, then it should also be considered whether the coverage boost levels from the neighbour cells should also be included in the serving cell to facilitate service continuity, i.e., in order to minimize the packet loss.

Proposal 2: RAN2 should discuss if the information of SC-PTM coverage (e.g., number of repetition, power boost level and MCS, or some integrated threshold/offset for reliability check) of the neighbour cells should be provided by the serving cell.

(2.2.3. Firmware/Software Update and Group Message Delivery)

From the service continuity point of view, the difference in Rel-14 (e.g., file delivery) is whether or not the lossless mobility is preferable, while Rel-13 (e.g., streaming) rather requited the lower access latency. However, the multicast is difficult to ensure the lossless mobility in the AS layer, since it's already agreed that "In Rel-14 we will not have a solution with feedback" and retransmission, and it depends on the eNB's scheduler (e.g., the packet delivery is not synchronized among eNBs in a network). But the upper layer mechanism, i.e., FLUTE, would compensate the packet loss in the AS layer, e.g., by the unicast file recovery. So, the lossless mobility may also rely on some upper layer mechanism in Rel-14 multicast.

Observation 3: No additional AS mechanism is necessary for the lossless mobility for Rel-14 multicast.

However, the amount of packet loss, e.g., missed FLUTE blocks, will depend on some AS layer configuration, e.g., synchronous delivery, SIB20 scheduling periodicity, SC-MCCH repetition period and so on. It affects to number of RRC Connection Request and duration of staying in RRC Connected, e.g., for the unicast file recovery, which cause additional UE power consumption. However, it's up to NW implementation how to minimize the packet loss, except for the assistance information discussed in sections 2.2.1 and 2.2.2.

Observation 4: It's up to NW implementation in Rel-14 on how to minimize the packet loss due to UE mobility.

The invention claimed is:

1. A user equipment supporting MBMS (Multimedia Broadcast Multicast Service) transmission using SC-PTM (Single Cell Point-To-Multipoint), comprising:
 a controller configured to monitor a MBMS signal periodically transmitted from a base station via SC-MCCH (Single Cell Multicast Control Channel) or SC-MTCH (Single Cell Multicast Traffic Channel); and
 a receiver configured to receive from the base station, notification information indicating a future timing at which the user equipment should receive the MBMS signal, the notification information associated with a MBMS service identifier, wherein
 the controller is configured to, based on the notification information, specify a monitoring unnecessary period during which monitoring of the MBMS signal can be omitted,
 the receiver is configured to receive an MBMS service from the base station via the SC-MTCH,
 the receiver is configured to receive, from the base station, MAC (Medium Access Control) CE (Control Element) indicating that transmission of the MBMS service via the SC-MTCH is stopped, and
 the controller is configured to determine that the transmission of the MBMS service via the SC-MTCH is stopped in response to the reception of the MAC CE, wherein
 the monitoring unnecessary period has a time length longer than a transmission period of the MBMS signal.

2. The user equipment according to claim 1, wherein the MAC CE is applied to a user equipment whose transmission and reception bandwidth is limited.

3. The user equipment according to claim 1, wherein the MAC CE is applied to a user equipment present in a coverage enhanced by a coverage enhancement function including a repetition.

4. A method, comprising:
 monitoring, by a user equipment supporting MBMS (Multimedia Broadcast Multicast Service) transmission using SC-PTM (Single Cell Point-To-Multipoint), a MBMS signal periodically transmitted via SC-MCCH (Single Cell Multicast Control Channel) or SC-MTCH (Single Cell Multicast Traffic Channel);
 receiving, by the user equipment from a base station, notification information indicating a future timing at which the user equipment should receive the MBMS signal, the notification information associated with a MBMS service identifier;

specifying by the user equipment based on the notification information, a monitoring unnecessary period during which monitoring of the MBMS signal can be omitted;

receiving by the user equipment from the base station, MAC (Medium Access Control) CE (Control Element) indicating that transmission of the MBMS service via the SC-MTCH is stopped, and determining by the user equipment, that the transmission of the MBMS service via the SC-MTCH is stopped in response to the reception of the MAC CE, wherein the monitoring unnecessary period has a time length longer than a transmission period of the MBMS signal.

5. A method for a user equipment supporting MBMS (Multimedia Broadcast Multicast Service) transmission using SC-PTM (Single Cell Point-To-Multipoint), the method comprising:

monitoring a MBMS signal periodically transmitted from a base station via SC-MCCH (Single Cell Multicast Control Channel) or SC-MTCH (Single Cell Multicast Traffic Channel);

receiving from the base station, notification information indicating a future timing at which the user equipment should receive the MBMS signal, the notification information associated with a MBMS service identifier;

based on the notification information, specifying a monitoring unnecessary period during which monitoring of the MBMS signal can be omitted;

receiving an MBMS service from the base station via the SC-MTCH;

receiving from the base station, MAC (Medium Access Control) CE (Control Element) indicating that transmission of the MBMS service via the SC-MTCH is stopped; and determining that the transmission of the MBMS service via the SC-MTCH is stopped in response to the reception of the MAC CE, wherein the monitoring unnecessary period has a time length longer than a transmission period of the MBMS signal.

6. The user equipment according to claim 1, wherein the notification information includes information indicating the future timing at which a content of the MBMS control information transmitted via the SC-MCCH is modified, and the monitoring unnecessary period is a period until the future timing at which the content of the SC-MCCH information is modified.

7. The user equipment according to claim 1, wherein the notification information includes information indicating the future timing at which MBMS data transmitted via the SC-MTCH is scheduled, and the monitoring unnecessary period is a period up to the future timing at which the MBMS data is scheduled.

* * * * *